(12) United States Patent
Li

(10) Patent No.: US 12,514,224 B1
(45) Date of Patent: Jan. 6, 2026

(54) PET WATER DISPENSER

(71) Applicant: Yule Li, Changsha (CN)

(72) Inventor: Yule Li, Changsha (CN)

( * ) Notice: Subject to any disclaimer, the term of this patent is extended or adjusted under 35 U.S.C. 154(b) by 0 days.

(21) Appl. No.: 19/169,407

(22) Filed: Apr. 3, 2025

(30) Foreign Application Priority Data

Mar. 21, 2025 (CN) .......................... 202520520429.7

(51) Int. Cl.
*A01K 7/02* (2006.01)
(52) U.S. Cl.
CPC ...................................... *A01K 7/02* (2013.01)
(58) Field of Classification Search
CPC .......... A01K 7/02; A01K 7/022; A01K 7/025; A01K 7/027; B05B 17/08
USPC .............................. 119/74; 239/17, 18, 20, 23
See application file for complete search history.

(56) References Cited

U.S. PATENT DOCUMENTS

| | | | | |
|---|---|---|---|---|
| 4,707,958 | A * | 11/1987 | Armbruster | B60J 10/70 52/208 |
| 11,317,604 | B1 * | 5/2022 | Pang | A01K 7/022 |
| 11,793,161 | B2 * | 10/2023 | Xue | A01K 7/02 |
| 2010/0300366 | A1 * | 12/2010 | Lipscomb | A01K 7/02 119/74 |
| 2015/0276204 | A1 * | 10/2015 | Ray | F21V 31/005 239/20 |
| 2017/0245465 | A1 * | 8/2017 | Oates | B65D 21/0234 |
| 2020/0029906 | A1 * | 1/2020 | Smith | A61B 5/6853 |
| 2020/0297151 | A1 * | 9/2020 | Park | A47J 27/21166 |
| 2020/0337266 | A1 * | 10/2020 | Yu | F16K 5/00 |
| 2022/0322640 | A1 * | 10/2022 | Ryan | A01K 27/009 |
| 2022/0386563 | A1 * | 12/2022 | Wang | A01K 7/02 |
| 2023/0397573 | A1 * | 12/2023 | Zou | A01K 7/00 |
| 2024/0057552 | A1 * | 2/2024 | Zou | A01K 7/025 |

FOREIGN PATENT DOCUMENTS

| | | | | |
|---|---|---|---|---|
| CN | 108770716 | A * | 11/2018 | ............. C02F 1/001 |
| CN | 113455419 | A * | 10/2021 | ............. B01D 29/03 |
| CN | 113854176 | A * | 12/2021 | ............. A01K 7/005 |

(Continued)

OTHER PUBLICATIONS

"Pogo pin", Dec. 26, 2024, Wikipedia; https://en.wikipedia.org/wiki/Pogo_pin (Year: 2024) fe74fe8a5924&crid=1GRO07B980NYY&cv_ct_cx=automatic%2Bpet%2Bwater%2Bdispenser&keywords=automatic%2Bpet%2Bwater%2Bdispenser&pd_rd_i=B0DRVKPPSL&pd_rd_r=7ae1dcd6-a781-4b4b-93e6-c8a1f05fd93b&pd_rd_w=ypk4y&pd_rd_wg=AECW6&pf_rd_p=dd72f1c7-655d-4b60-b1bd- (Year: 2024)*

(Continued)

*Primary Examiner* — Kimberly S Berona
*Assistant Examiner* — Erica Michelle Huebner

(57) ABSTRACT

A pet water dispenser includes a water dispenser main body, a main unit, and a water pump. An accommodating cavity is defined in the water dispenser main body. The accommodating cavity is used for accommodating liquid. A battery and a control motherboard are provided inside the main unit. The main unit is provided with a first conductive terminal. The first conductive terminal is electrically connected to the battery and the control motherboard. The water pump is used for drawing the liquid inside the accommodating cavity. The water pump is provided with a second conductive terminal, and the second conductive terminal is detachably connected to the first conductive terminal, so that the water pump is electrically connected to the battery and the control motherboard.

18 Claims, 20 Drawing Sheets

(56) References Cited

FOREIGN PATENT DOCUMENTS

| | | | | | |
|---|---|---|---|---|---|
| CN | 215836489 U | * | 2/2022 | | |
| CN | 115211382 A | * | 10/2022 | ............... | A01K 7/02 |
| CN | 115250941 A | * | 11/2022 | ............... | C02F 9/00 |
| KR | 20210009099 A | * | 1/2021 | ............ | B01D 37/04 |
| WO | WO-2020022543 A1 | * | 1/2020 | ............... | G01J 1/02 |
| WO | WO-2020060248 A1 | * | 3/2020 | ............... | A01K 7/02 |

OTHER PUBLICATIONS

Tomxcute, "Wireless Cat Water Fountain . . . ", Dec. 30, 2024, Amazon; https://www.amazon.com/Wireless-Cat-Water-Fountain-Rechargeable/dp/B0DRVKPPSL/ref=sxin_17_pa_sp_search_thematic_sspa?content-id=amzn1.sym.dd72f1c7-655d-4b60-b1bd-fe74fe8a5924%3Aamzn1.sym.dd72f1c7-655d-4b60-b1bd- (Year: 2024) fe74fe8a5924&pf_rd_r=RZVAFZFGBGE0M4EA9SDD&qid=1750714035&sbo=RZvfv%2F%2FHxDF%2BO5021pAnSA%3D%3D&sprefix=automatic%2Bpet%2Bwater%2Bdispenser%2Caps%2C174&sr=1-98-f853d353-bf33-45e7-b5c2-2cb2b31abc9b-spons&xpid=vSSMDbj2XWFZ2&sp_csd=d2lkZ2V0TmFtZT1zcF9zZWFyY2hfdGhlbWF0aWM&th=1 (Year: 2024).*

\* cited by examiner

PET WATER DISPENSER

CROSS-REFERENCE TO RELATED APPLICATIONS

The application claims priority of Chinese patent application CN2025205204297, filed on Mar. 21, 2025, which is incorporated herein by reference in its entireties.

TECHNICAL FIELD

The present invention relates to the field of pet supplies, particularly to a pet water dispenser.

BACKGROUND ART

Traditional pet watering methods require owners to constantly monitor the water quantity and frequently add water, which is particularly inconvenient when the owners are away from home. This gives busy owners a headache because they cannot stay at home all the time to take care of their pets' drinking needs. Therefore, there is an urgent need to provide a pet water dispenser on the market, so that pets can drink water in a timely manner.

SUMMARY

In order to overcome the shortcomings of the prior art, the present invention provides a pet water dispenser. The pet water dispenser includes:
  a water dispenser main body, wherein an accommodating cavity is defined in the water dispenser main body, and the accommodating cavity is used for accommodating liquid;
  a main unit, wherein a battery and a control motherboard are provided inside the main unit, the main unit is provided with a first conductive terminal, and the first conductive terminal is electrically connected to the battery and the control motherboard; and
  a water pump, wherein the water pump is used for drawing the liquid inside the accommodating cavity; the water pump is provided with a second conductive terminal, and the second conductive terminal is detachably connected to the first conductive terminal, so that the water pump is electrically connected to the battery and the control motherboard.

Beneficial effects of the present invention are as follows. The present invention provides the pet water dispenser. The pet water dispenser includes the water dispenser main body, the main unit, and the water pump. The accommodating cavity is defined in the water dispenser main body, and the accommodating cavity is used for accommodating liquid. The battery and the control motherboard are provided inside the main unit, the main unit is provided with the first conductive terminal, and the first conductive terminal is electrically connected to the battery and the control motherboard. The water pump is used for drawing the liquid inside the accommodating cavity. The water pump is provided with the second conductive terminal, and the second conductive terminal is detachably connected to the first conductive terminal, so that the water pump is electrically connected to the battery and the control motherboard. Therefore, it is convenient for a user to accurately and quickly install the main unit and the water pump, thereby facilitating the disassembly and assembly of the water dispenser main body, and also facilitating the maintenance of the water pump and the main unit.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
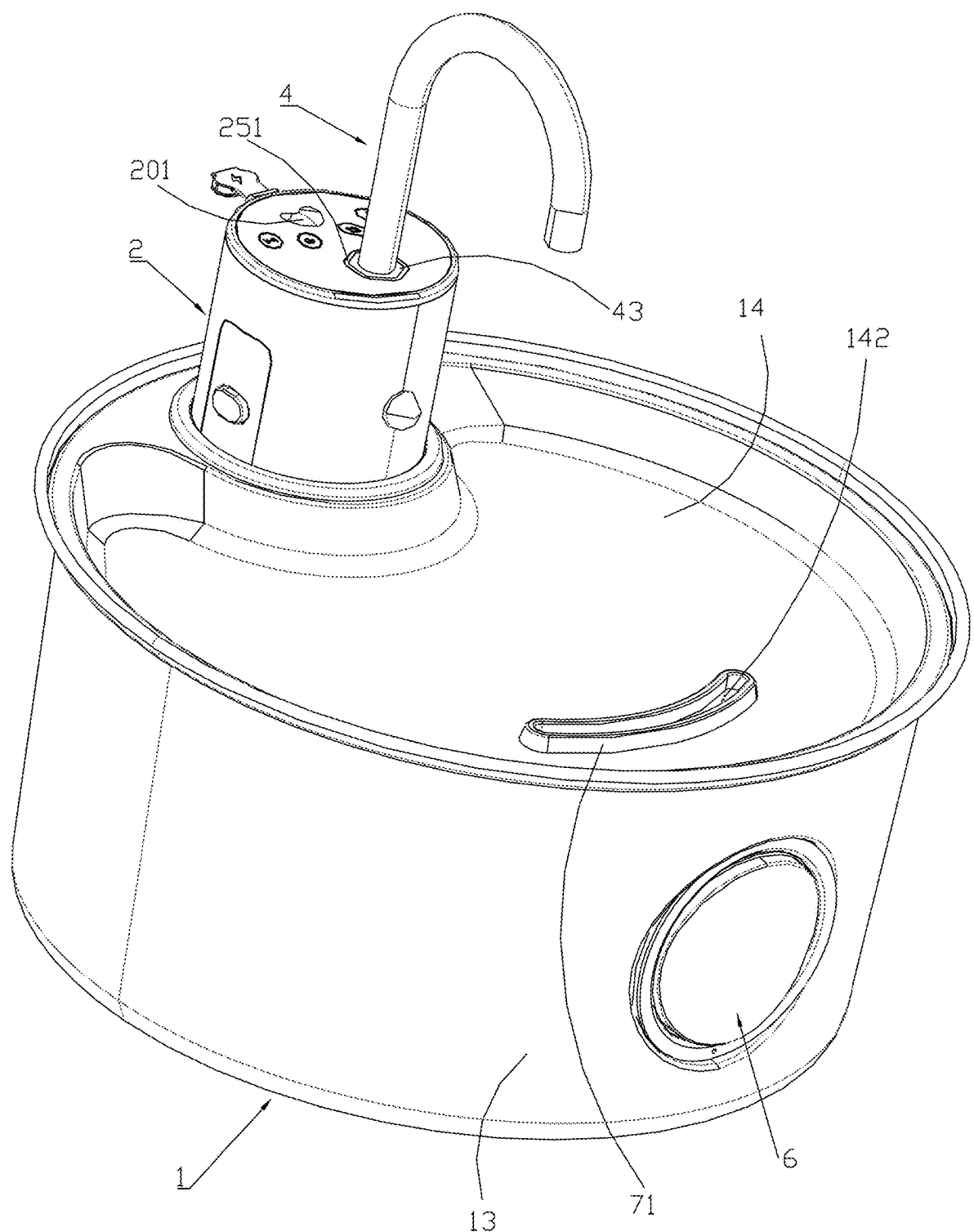
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
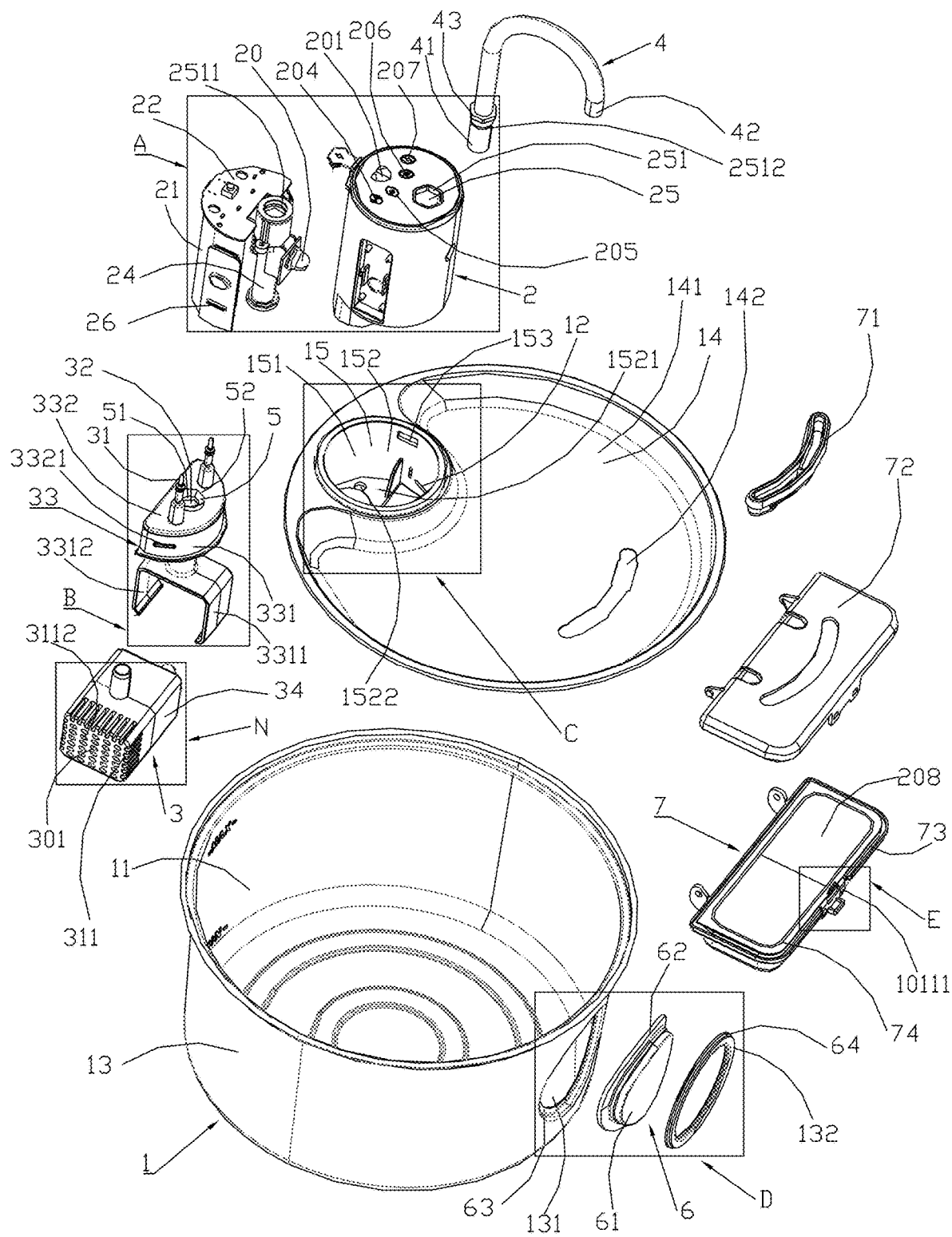
FIG. 2 is an exploded view of the present invention.
Figure 3:
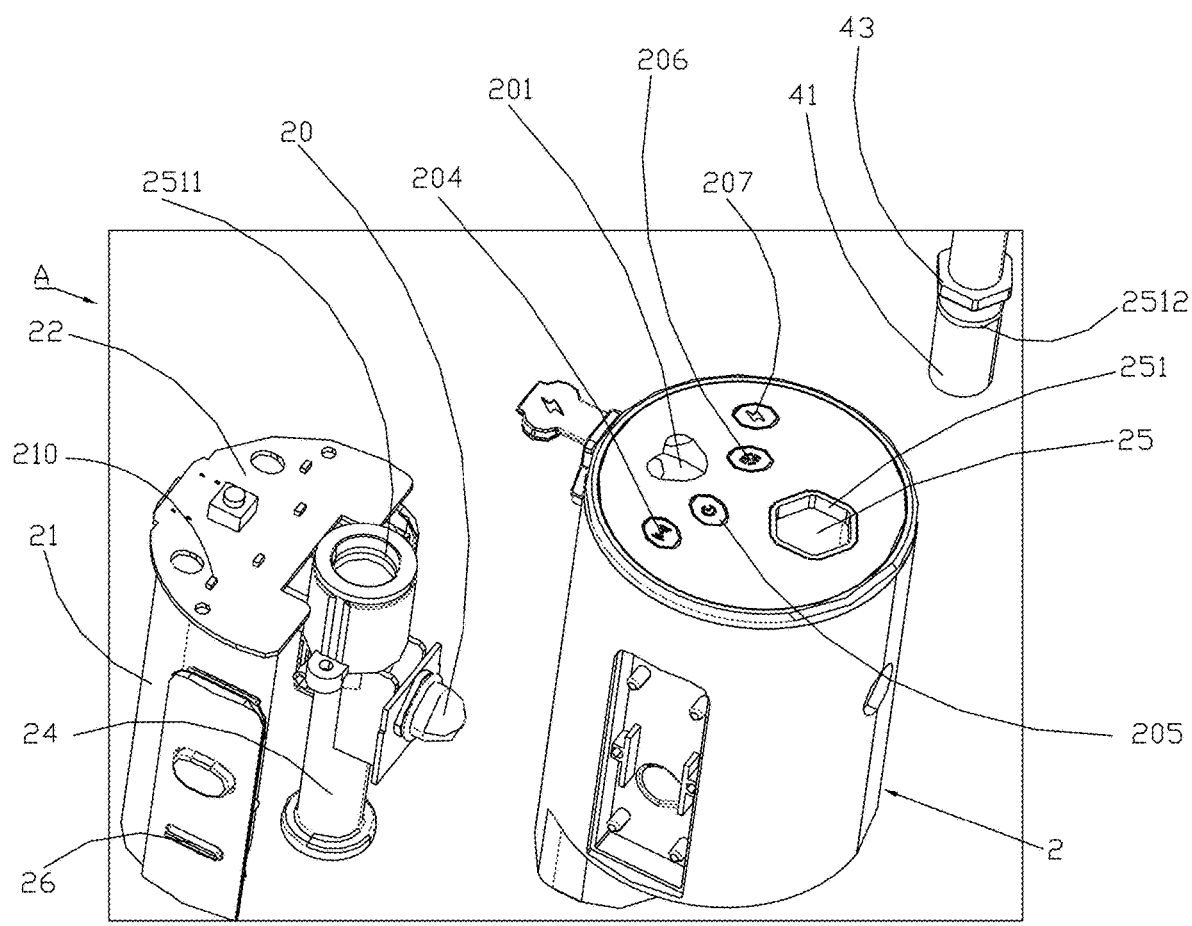
FIG. 3 is an enlarged view of area A in FIG. 2.
Figure 4:
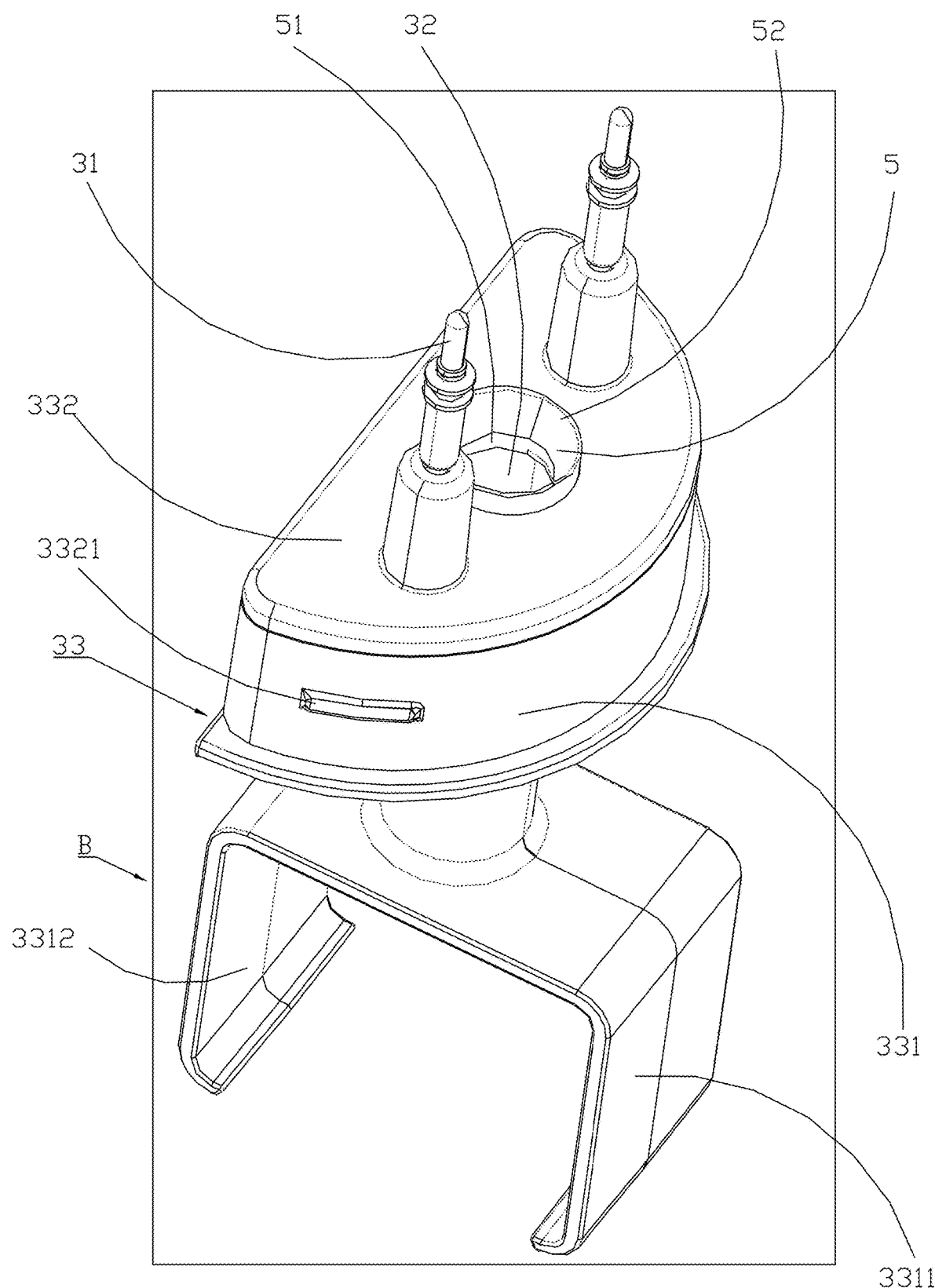
FIG. 4 is an enlarged view of area B in FIG. 2.
Figure 5:
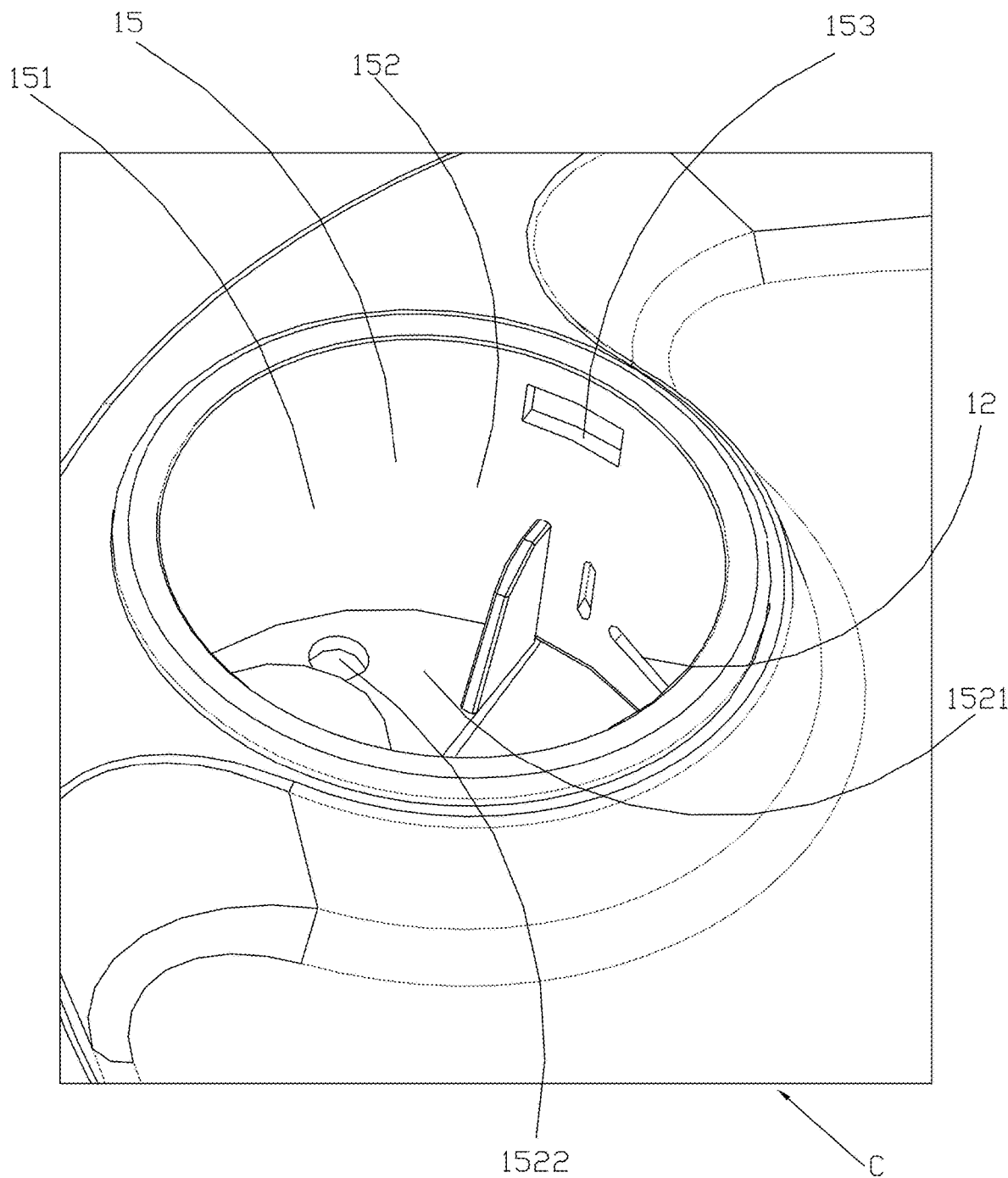
FIG. 5 is an enlarged view of area C in FIG. 2.
Figure 6:
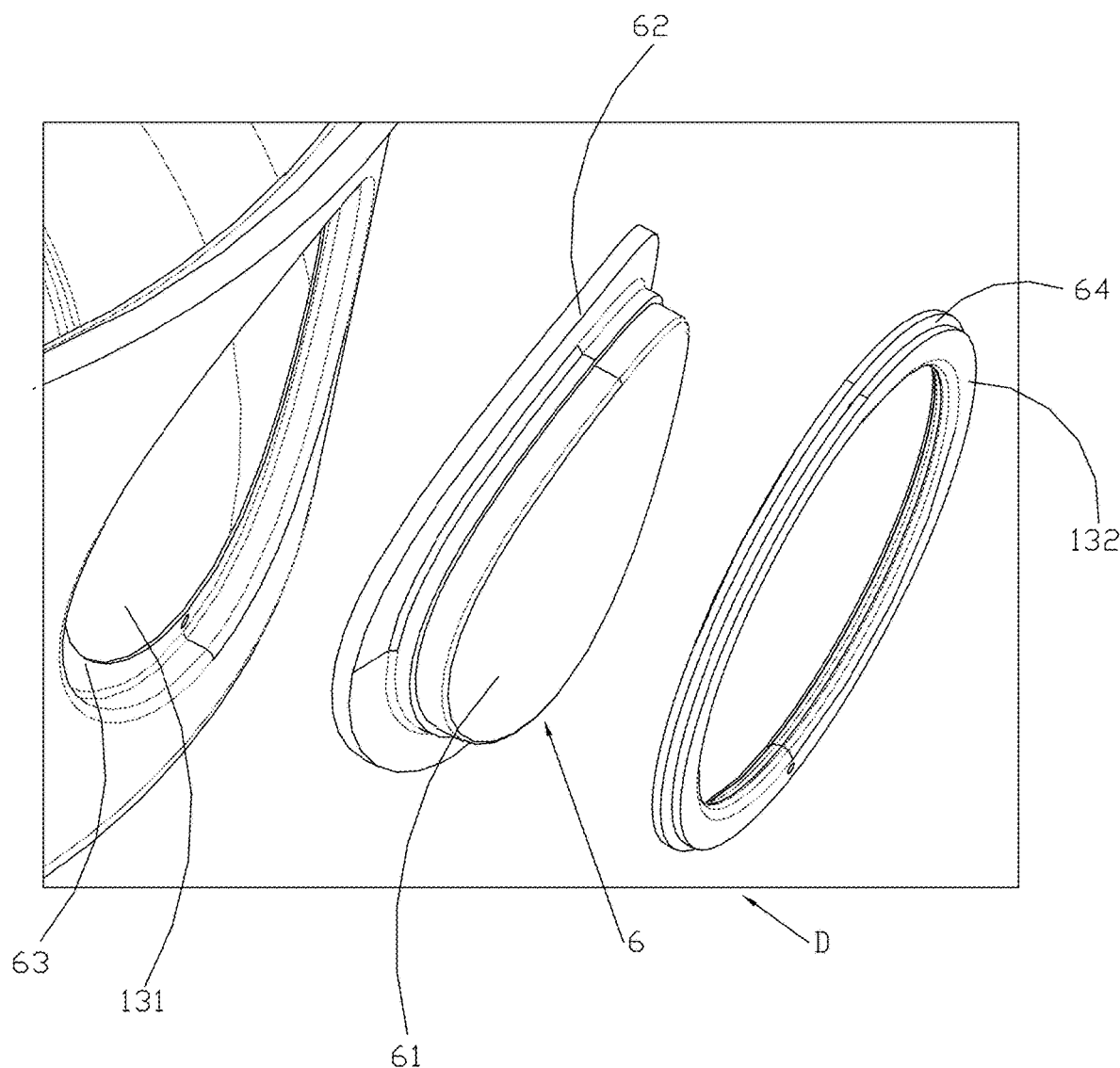
FIG. 6 is an enlarged view of area D in FIG. 2.
Figure 7:
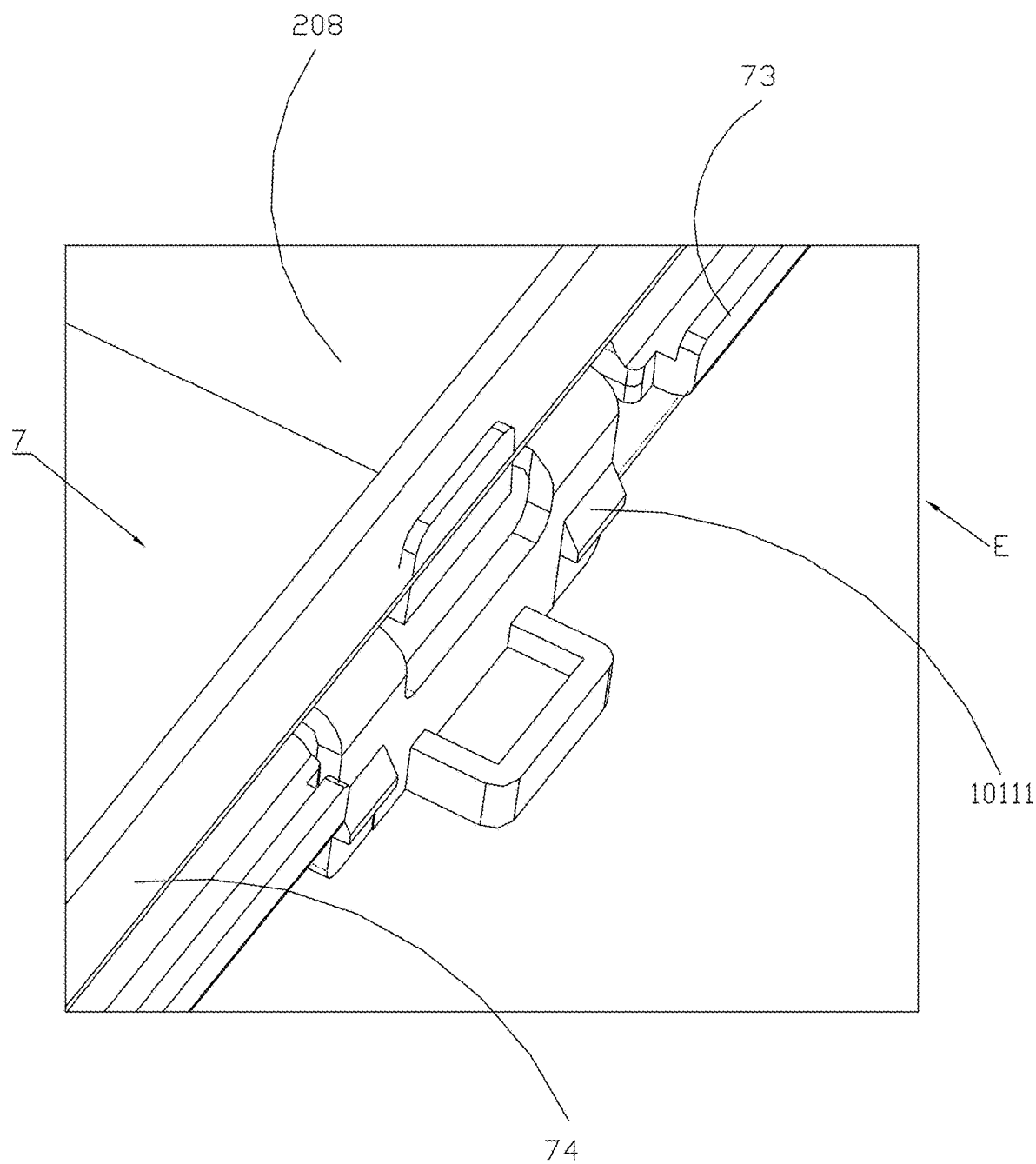
FIG. 7 is an enlarged view of area E in FIG. 2.
Figure 8:
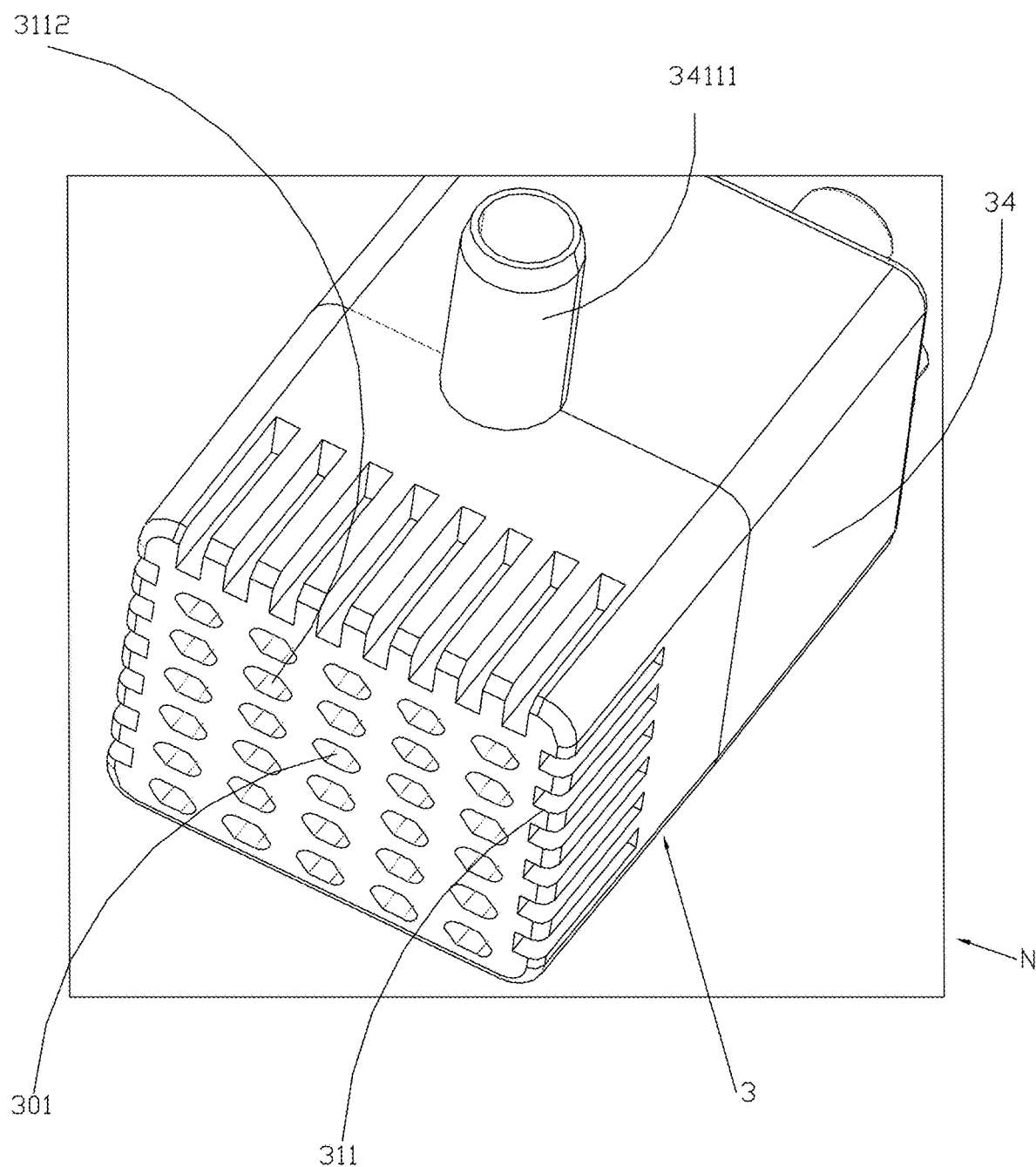
FIG. 8 is an enlarged view of area N in FIG. 2.
Figure 9:
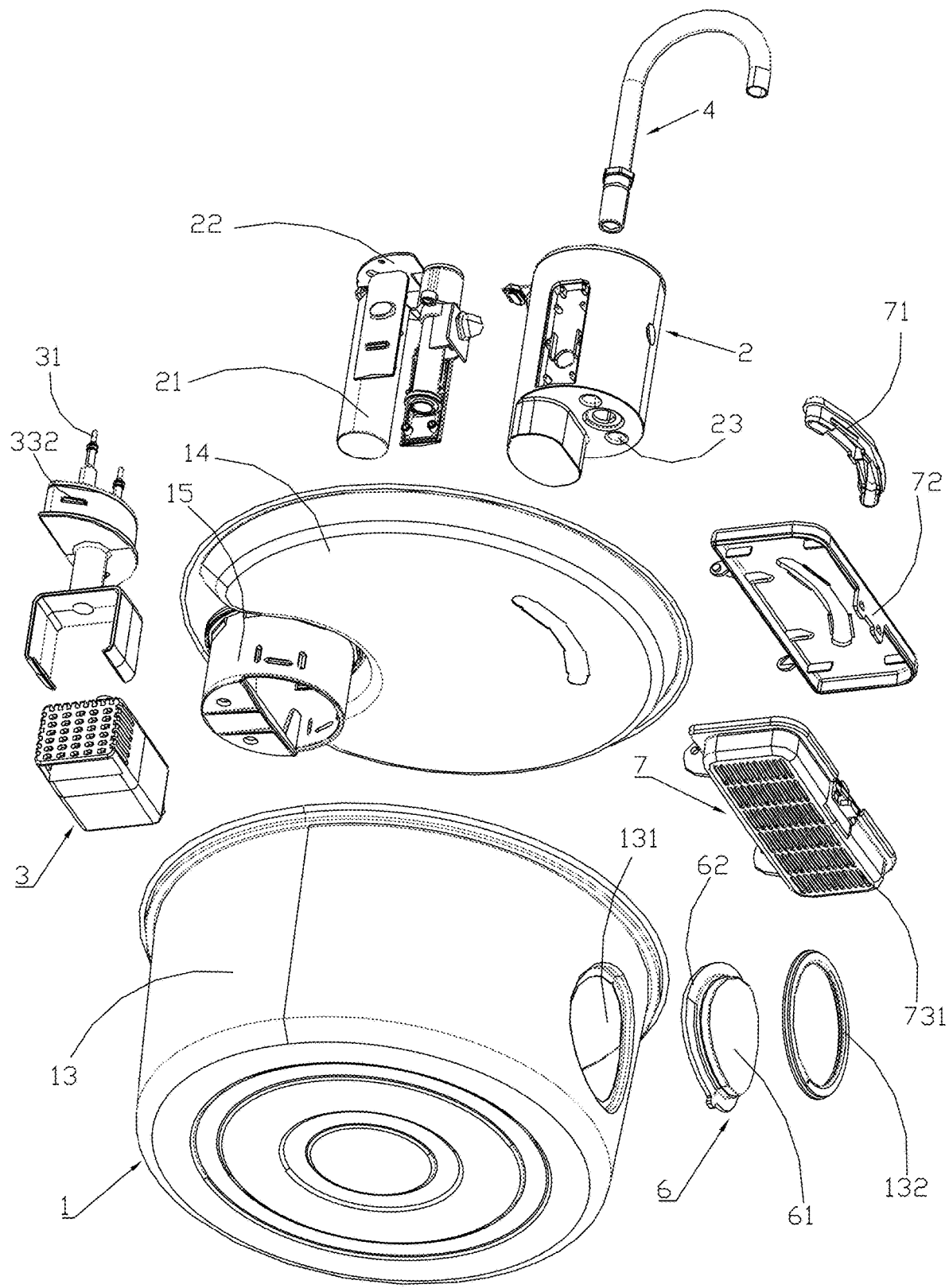
FIG. 9 is another exploded view of the present invention.
Figure 10:
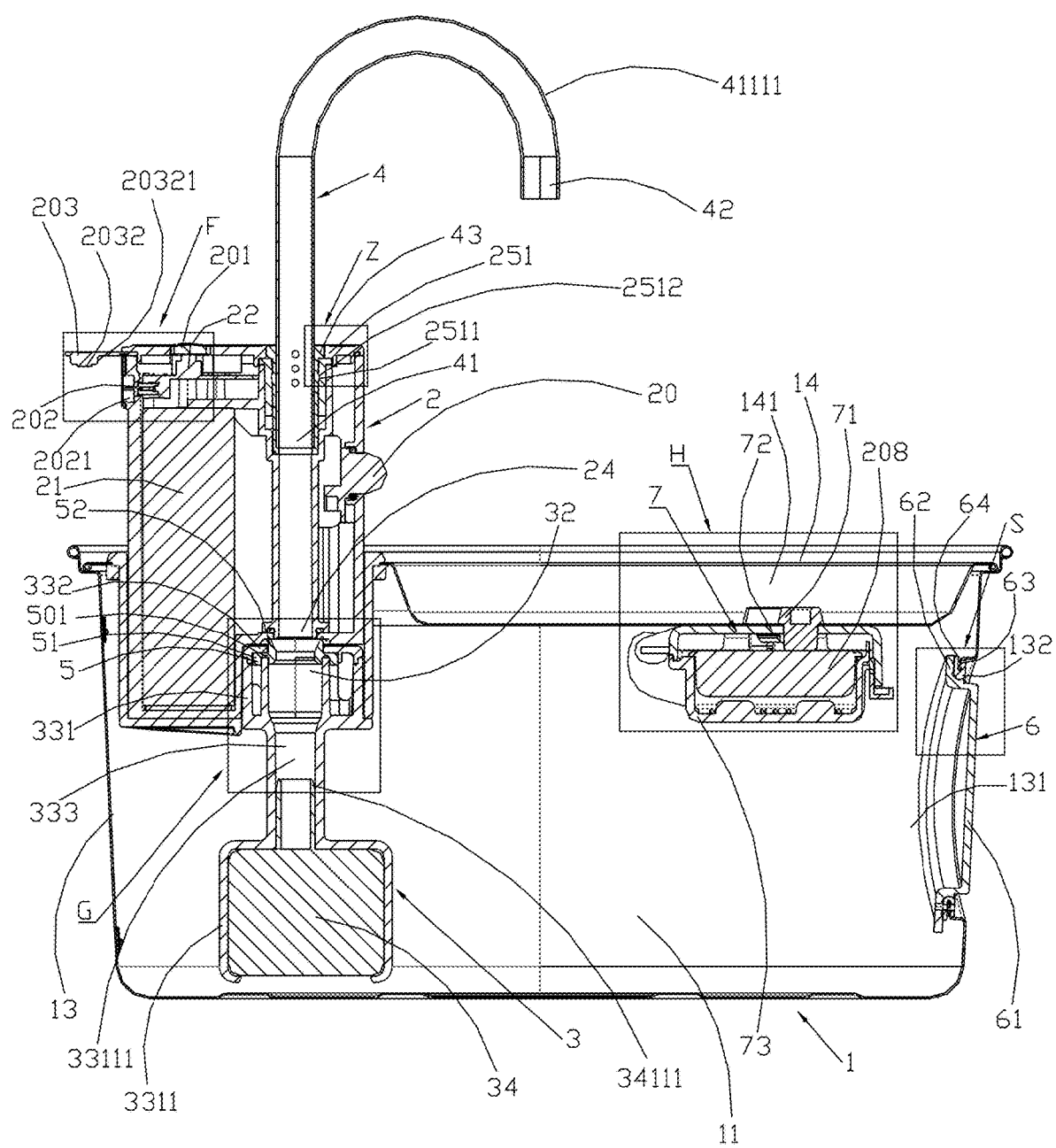
FIG. 10 is a sectional view taken along a water outlet pipe and a water pump.
Figure 11:
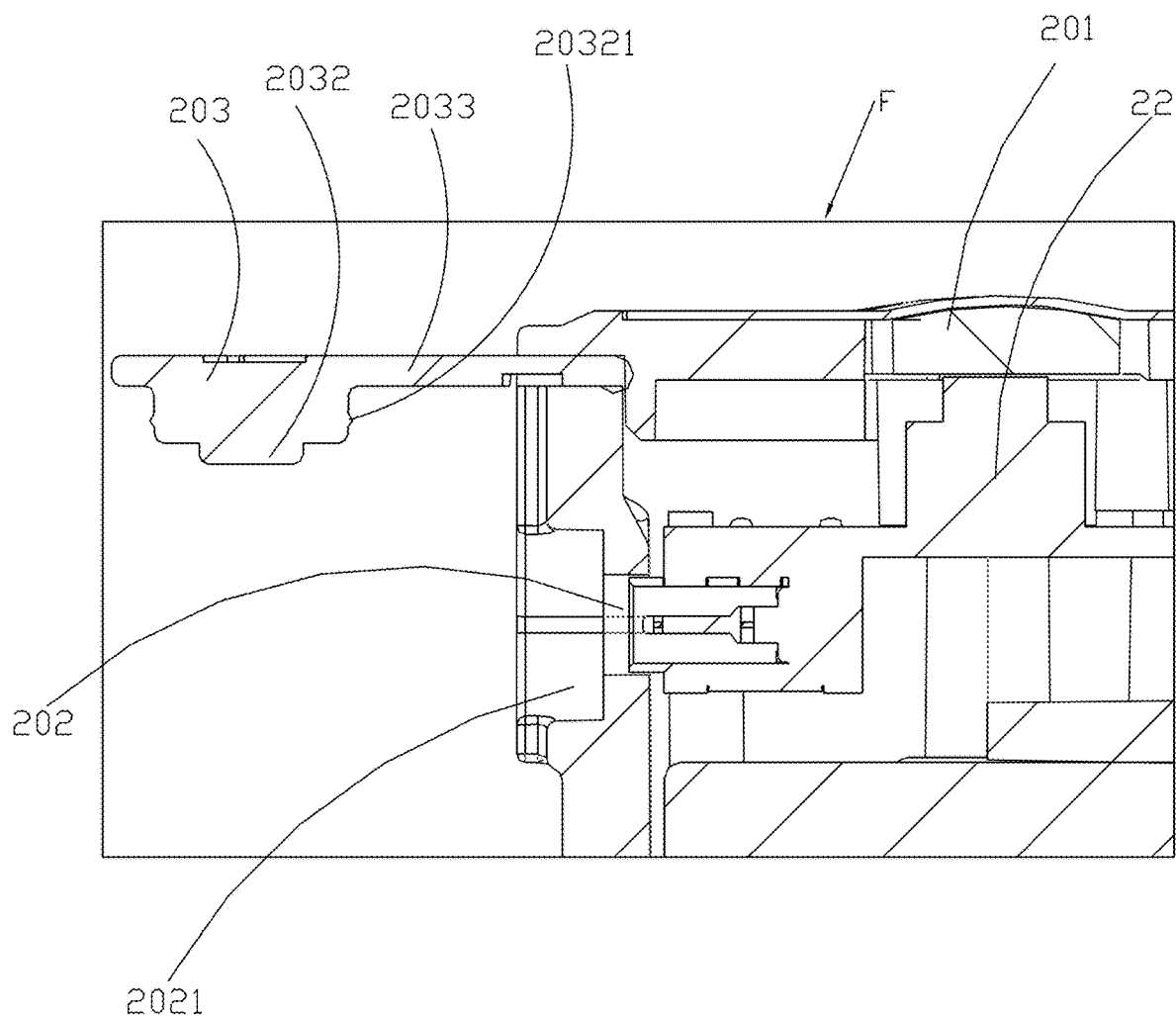
FIG. 11 is an enlarged view of area F in FIG. 10.
Figure 12:
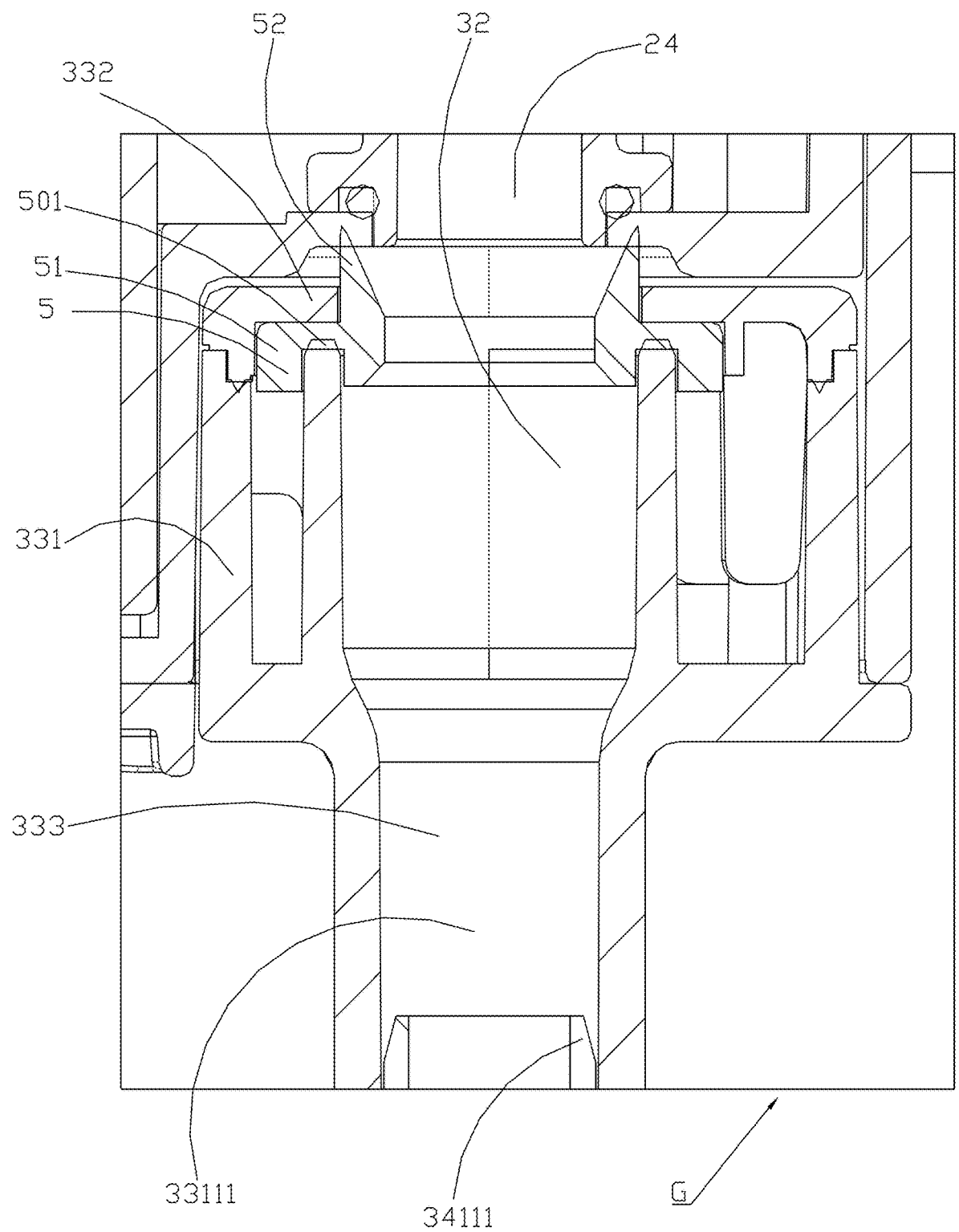
FIG. 12 is an enlarged view of area G in FIG. 10.
Figure 13:
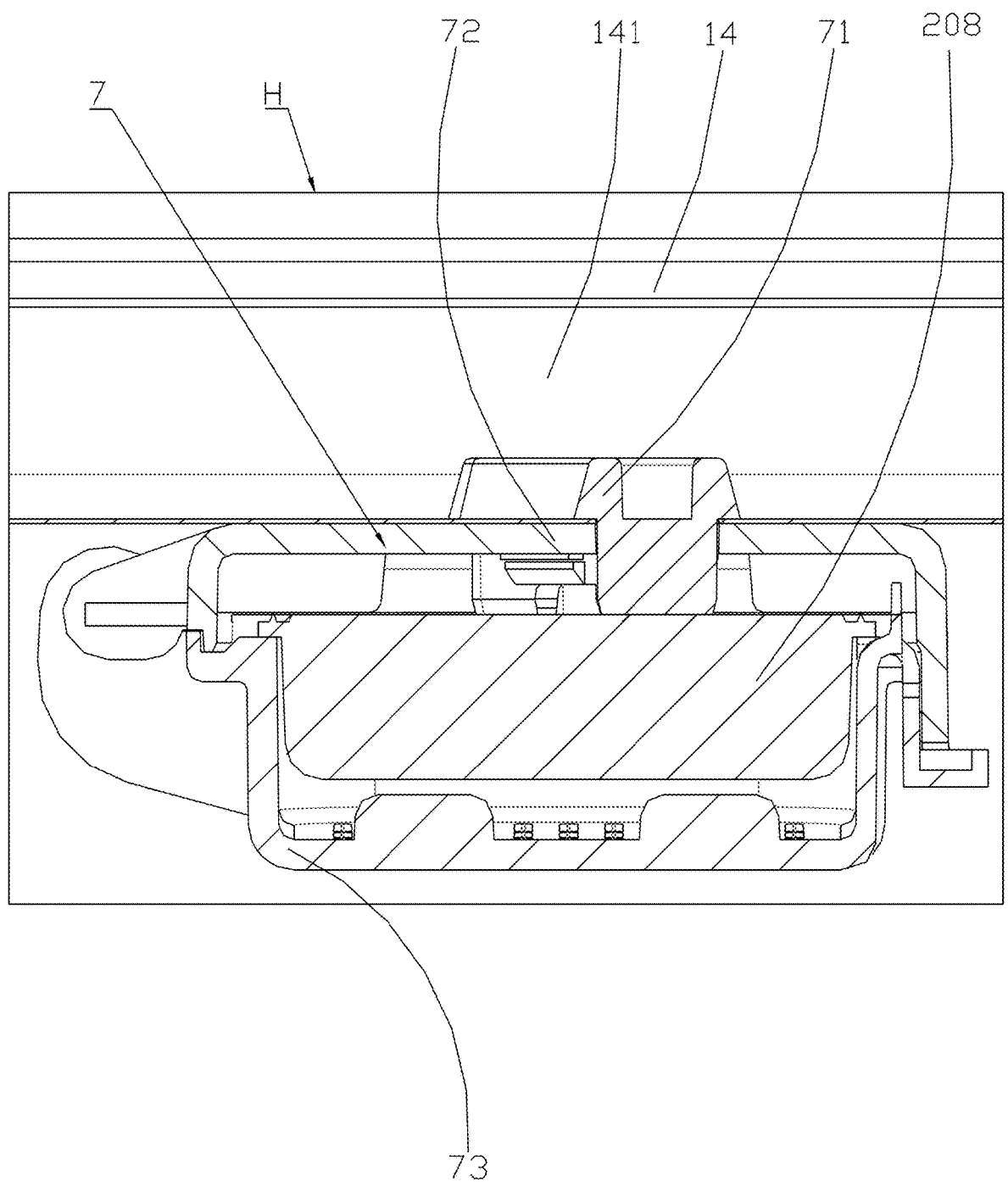
FIG. 13 is an enlarged view of area H in FIG. 10.
Figure 14:
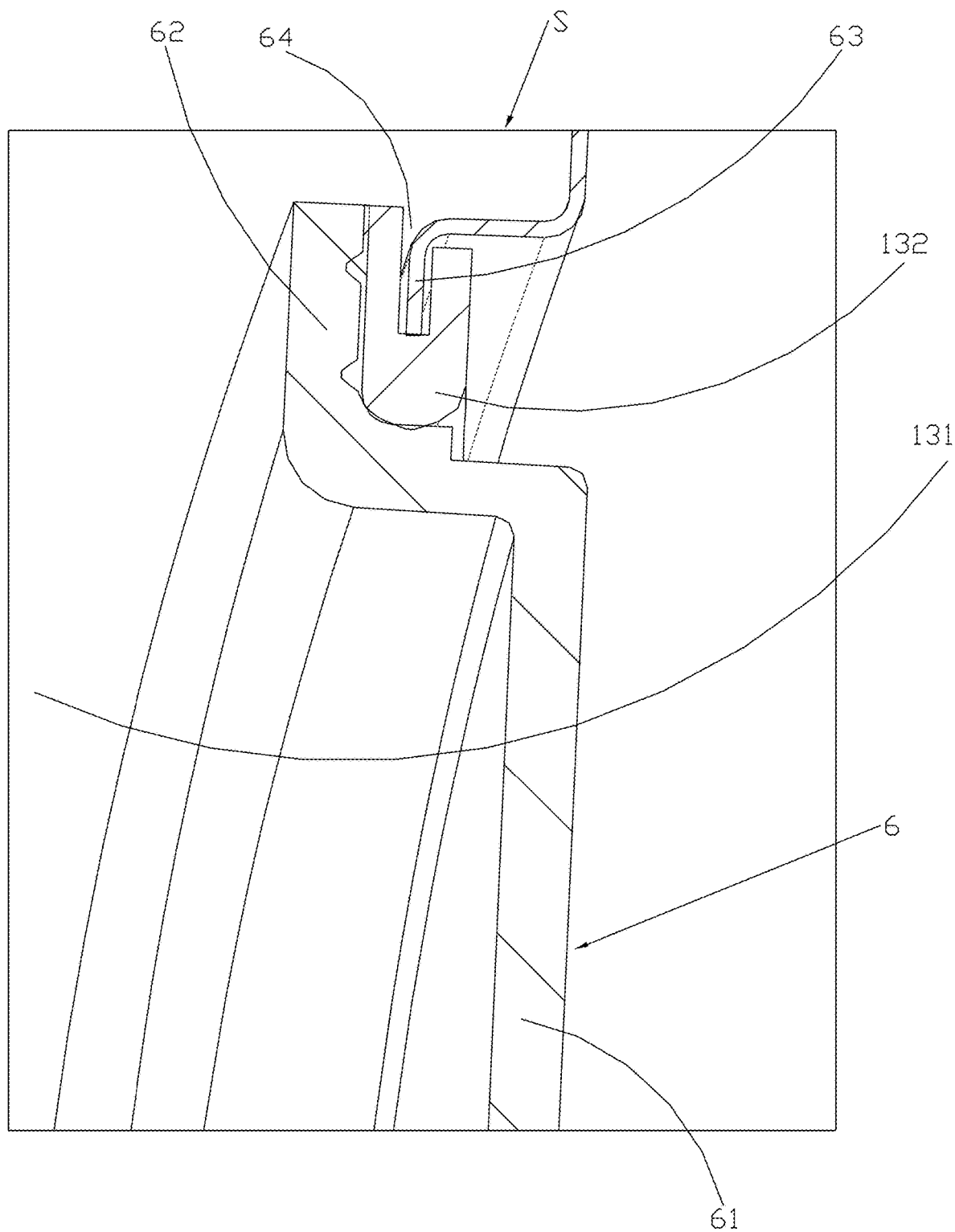
FIG. 14 is an enlarged view of area S in FIG. 10.
Figure 15:
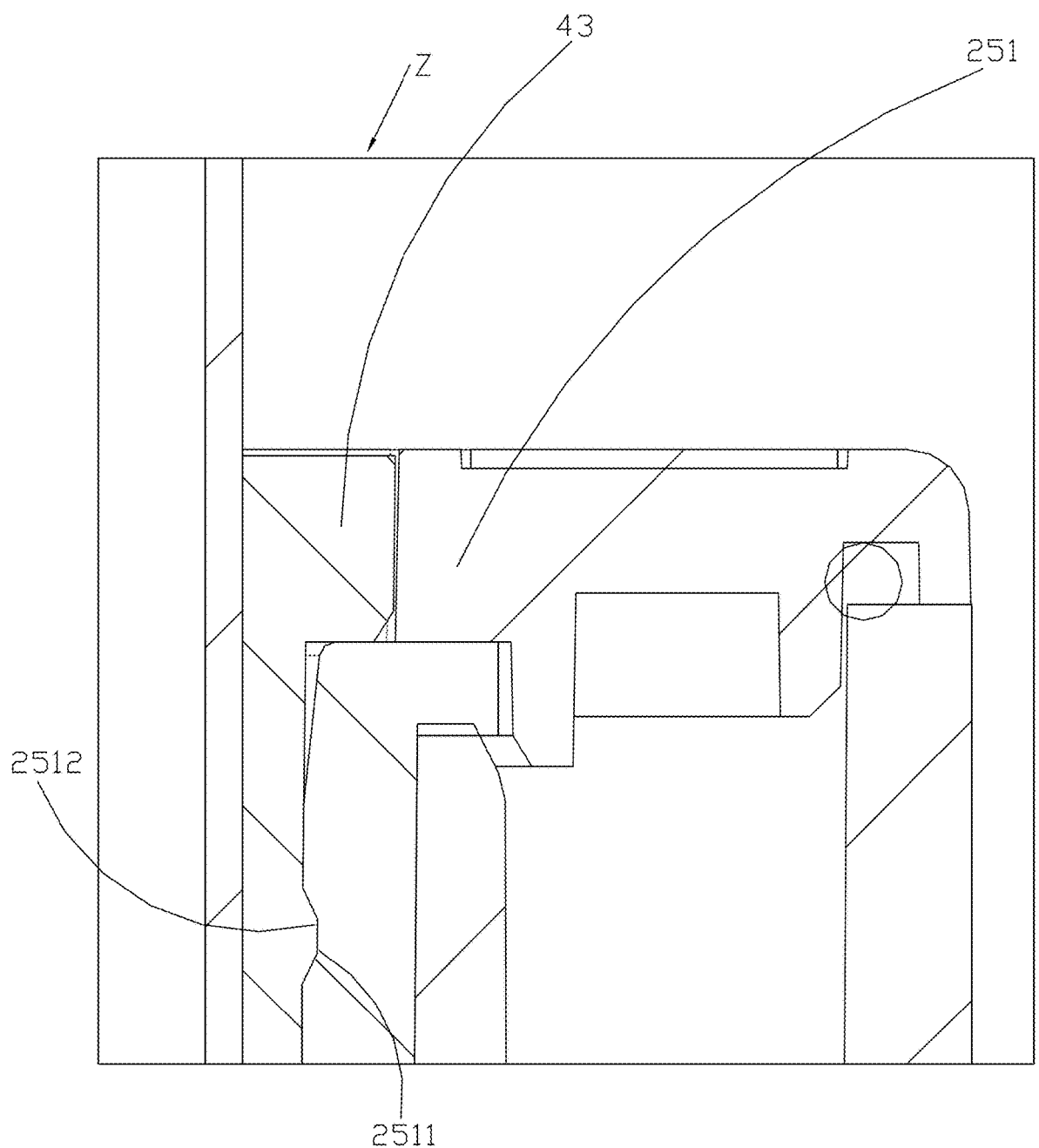
FIG. 15 is an enlarged view of area Z in FIG. 10.
Figure 16:
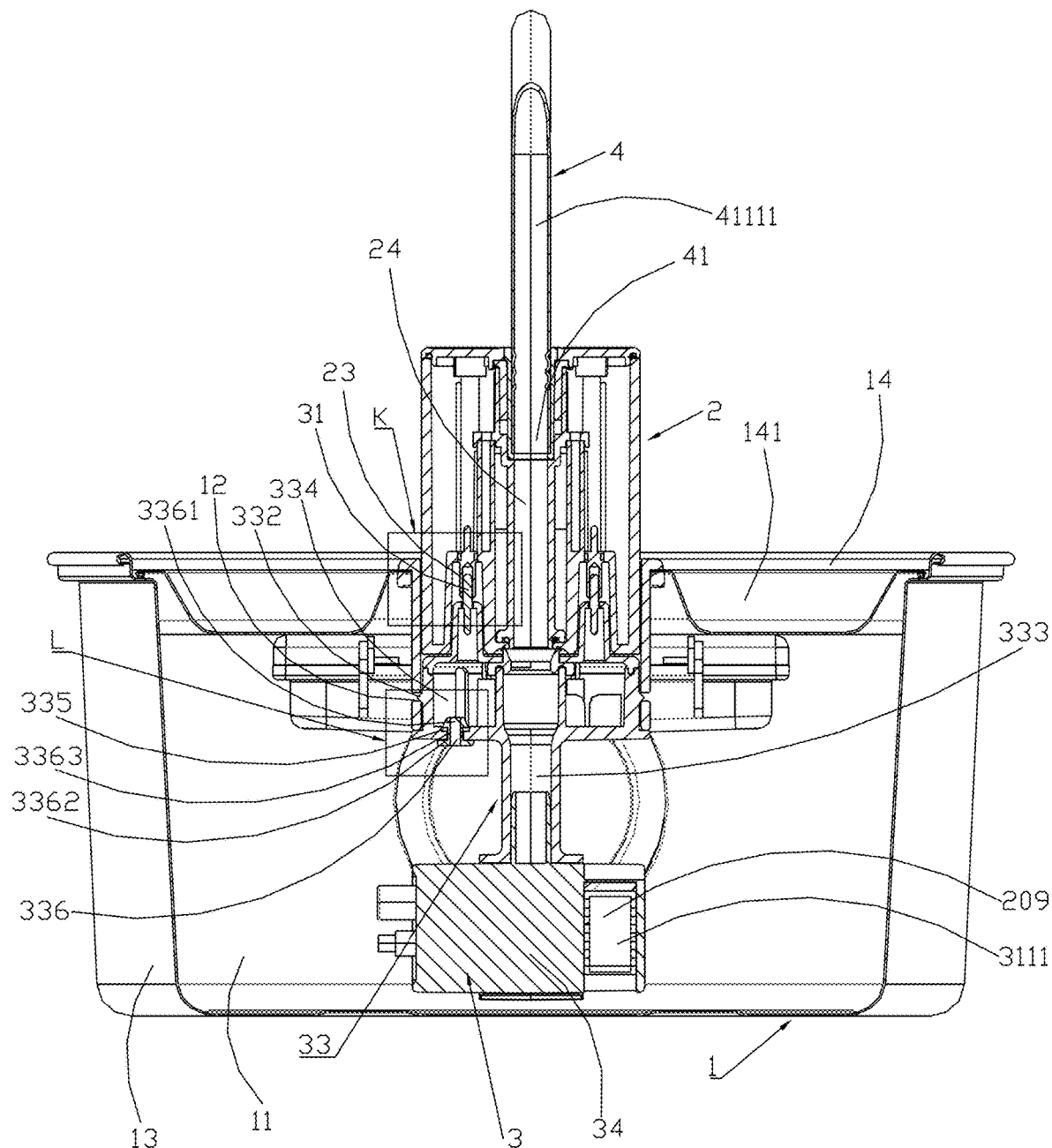
FIG. 16 is a sectional view taken along a first conductive terminal and a second conductive terminal.
Figure 17:
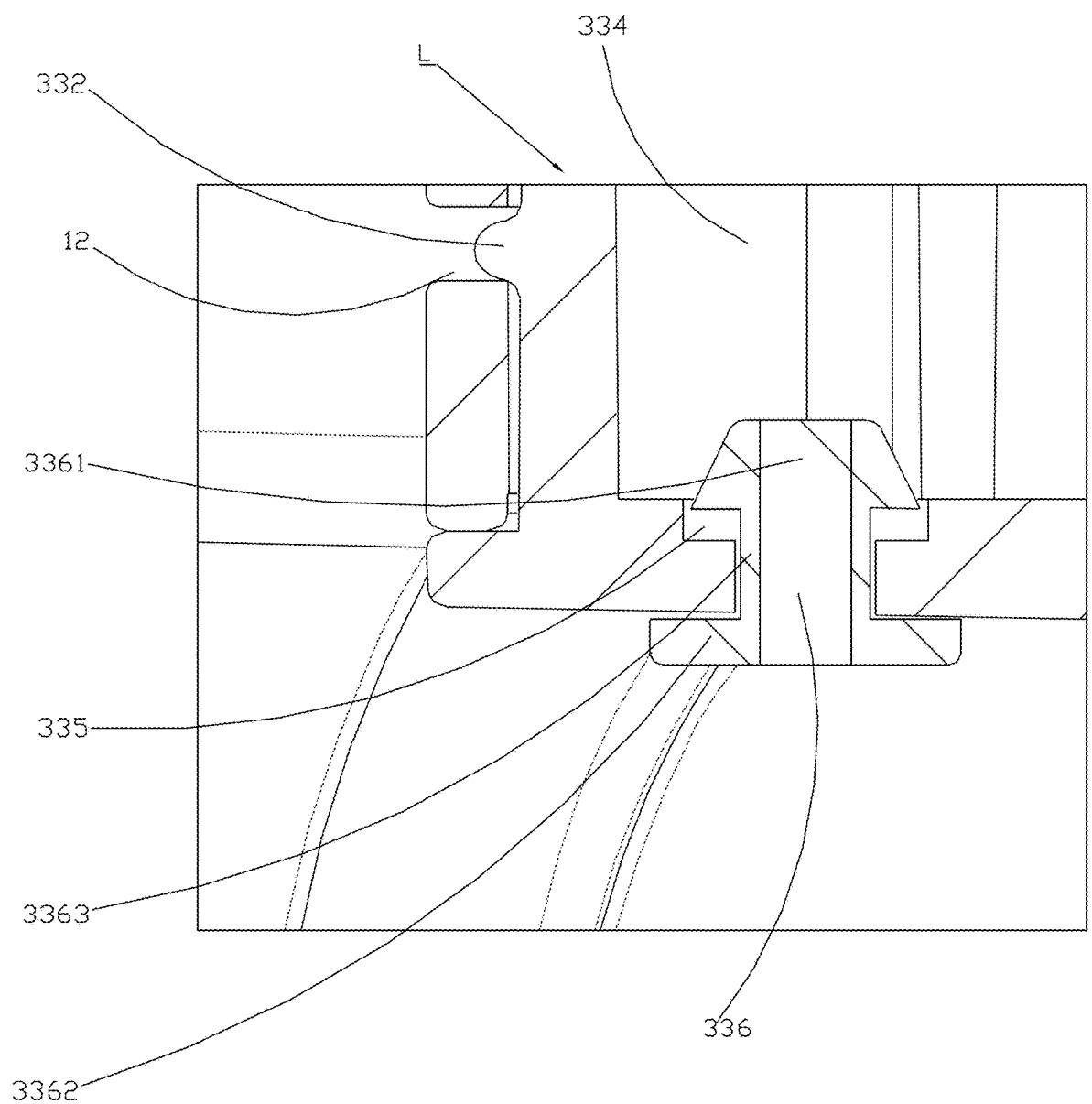
FIG. 17 is an enlarged view of area L in FIG. 16.
Figure 18:
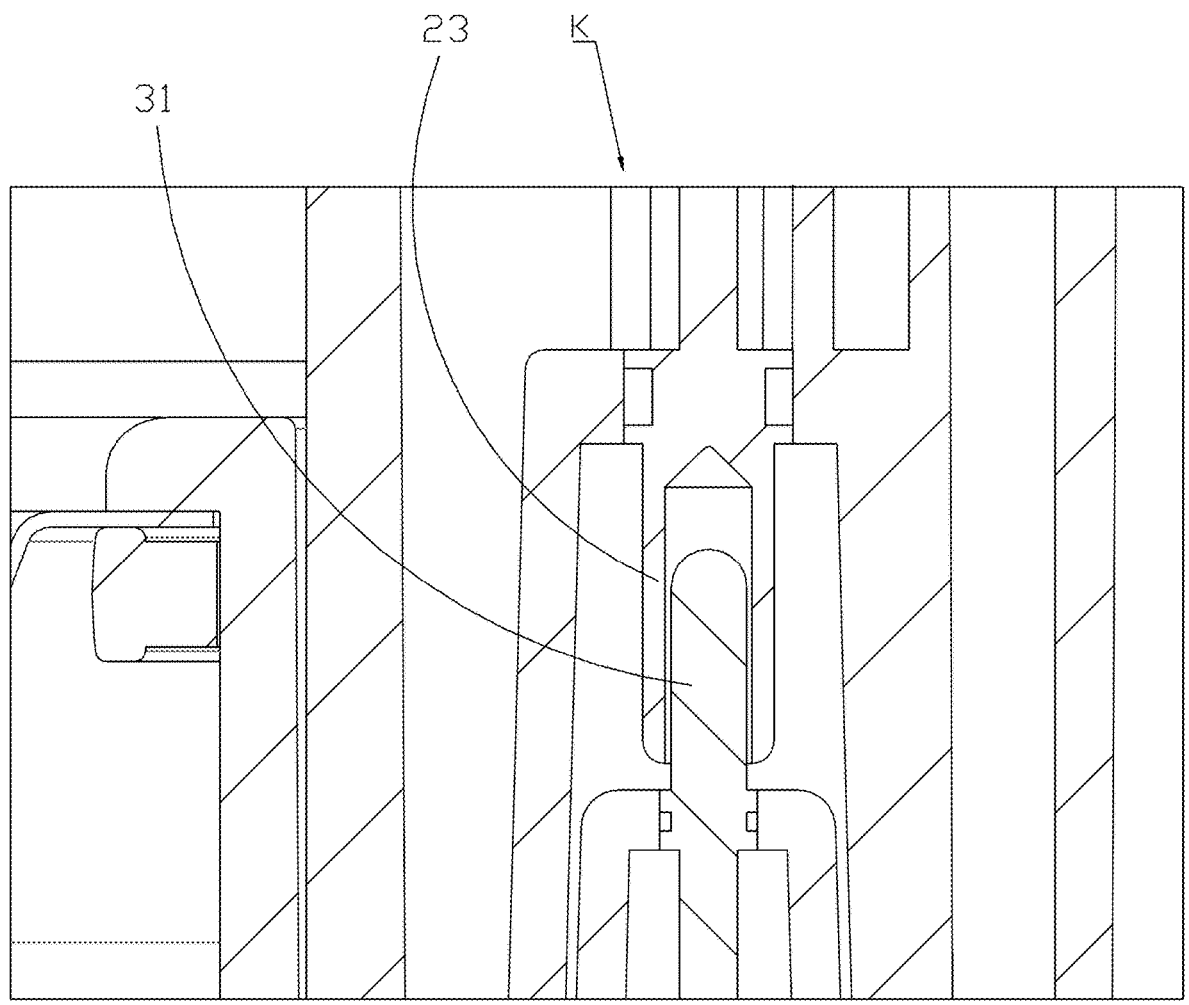
FIG. 18 is an enlarged view of area K in FIG. 16.
Figure 19:
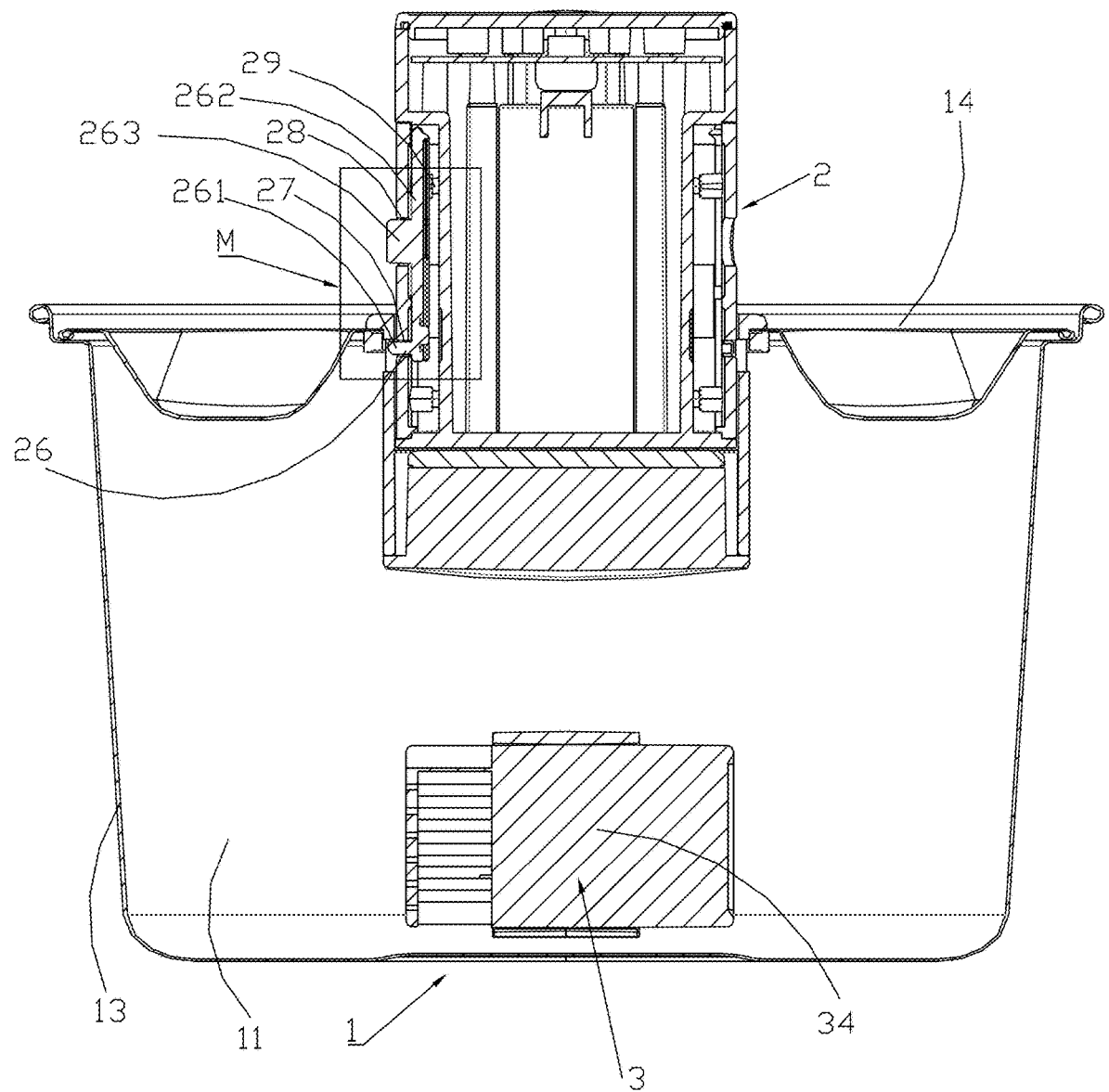
FIG. 19 is a sectional view taken along a first buckle portion and a second buckle portion.
Figure 20:
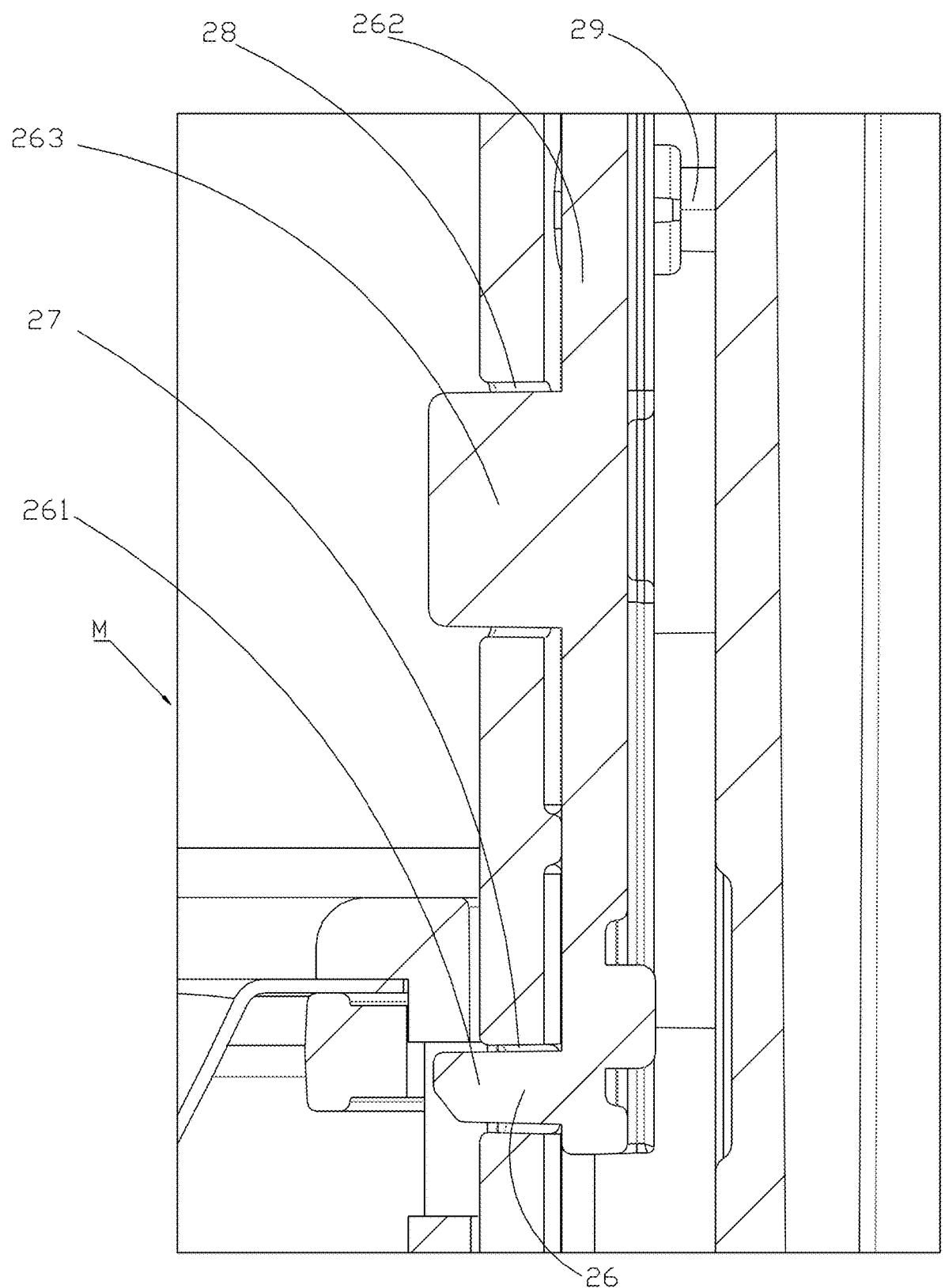
FIG. 20 is an enlarged view of area M in FIG. 19.

Referring to FIGS. 1-20, a pet water dispenser includes:
a water dispenser main body 1, wherein an accommodating cavity 11 is defined in the water dispenser main body 1, and the accommodating cavity 11 is used for accommodating liquid;
a main unit 2, wherein a battery 21 and a control motherboard 22 are provided inside the main unit 2, the main unit 2 is provided with a first conductive terminal 23, and the first conductive terminal 23 is electrically connected to the battery 21 and the control motherboard 22; and
a water pump 3, wherein the water pump 3 is used for drawing the liquid inside the accommodating cavity 11; the water pump 3 is provided with a second conductive terminal 31, and the second conductive terminal 31 is detachably connected to the first conductive terminal 23, so that the water pump 3 is electrically connected to the battery 21 and the control motherboard 22.

Through the above structure, the pet water dispenser includes the water dispenser main body 1, the main unit 2, and the water pump 3. The accommodating cavity 11 is defined in the water dispenser main body 1, and the accommodating cavity 11 is used for accommodating liquid. The battery 21 and the control motherboard 22 are provided inside the main unit 2, the main unit 2 is provided with the first conductive terminal 23, and the first conductive terminal 23 is electrically connected to the battery 21 and the control motherboard 22. The water pump 3 is used for drawing the liquid inside the accommodating cavity 11. The water pump 3 is provided with the second conductive terminal 31, and the second conductive terminal 31 is detachably connected to the first conductive terminal 23, so that the water pump 3 is electrically connected to the battery 21 and the control motherboard 22. Therefore, it is convenient for a user to accurately and quickly install the main unit 2 and the water pump 3, thereby facilitating the disassembly and assembly of the water dispenser main body 1, and also facilitating the maintenance of the water pump 3 and the main unit.

In this embodiment, the first conductive terminal 23 is a protruding first conductive pogo pin, and the second conductive terminal 31 is a conductive ring. The first conductive pogo pin is detachably inserted into the conductive ring, so that a side wall of the first conductive pogo pin abuts against a side wall of the conductive ring, so as to electrically connect the water pump 3 to the battery 21. Alternatively, the first conductive terminal 23 is a protruding conductive ring, and the second conductive terminal 31 is a second conductive pogo pin. The first conductive pogo pin is detachably inserted into the conductive ring, so that a side wall of the first conductive pogo pin abuts against a side wall of the conductive ring, so as to electrically connect the water pump 3 to the battery 21. Through the above structure, the arrangement of the first conductive terminal 23 and the second conductive terminal 31 is effectively achieved, allowing the first conductive terminal 23 and the second conductive terminal 31 to be connected with each other in a nesting manner, making the connection between the first conductive terminal 23 and the second conductive terminal 31 more stable.

In this embodiment, the pet water dispenser further includes a water outlet pipe 4. The main unit 2 is provided with a first water flow channel 24 and a first installation hole 25. The first water flow channel 24 is in communication with the first installation hole 25. The water pump 3 is provided with a first water inlet 301 and a first water outlet 32. The water outlet pipe 4 is provided with a second water inlet 41 and a second water outlet 42. The water outlet pipe 4 is detachably connected to the first installation hole 25. The water outlet pipe 4 is sequentially in communication with the first water flow channel 24, the first water outlet 32, and the first water inlet 301. The water pump 3 is used for driving the liquid in the accommodating cavity 11 to pass through the first water inlet 301, the first water outlet 32, the first water flow channel 24, the second water inlet 41, and the second water outlet 42 in sequence and flow out through the second water outlet 42. The water outlet pipe 4 includes a positioning ring 43. A positioning inner wall 251 is provided in the first installation hole 25. When the water outlet pipe 4 is detachably connected to the first installation hole 25, the positioning ring 43 is connected to the positioning inner wall 251, and the positioning ring 43 and the positioning inner wall 251 are not rotatable relative to each other, so that the water outlet pipe 4 is not rotatable inside the first installation hole 25. Specifically, the water outlet pipe 4 also includes a water pipe 41111. The positioning ring 43 is sleeved onto the water pipe. Furthermore, the positioning ring 43 is a polygonal positioning ring 43. The positioning inner wall 251 is a polygonal positioning inner wall 251 complementary to the positioning ring 43. Through the above structure, a direction of the water outlet pipe 4 can be fixed, and a position of the water outlet pipe 4 can be prevented from shifting, thereby fixing a water outlet direction of the water outlet pipe 4, and making it convenient for a pet to drink the water flowing out from the second water outlet 42 of the water outlet pipe 4. A stop slot 2511 is also defined in the first installation hole. The water outlet pipe is equipped with a protruding stop ring 2512. The stop ring 2512 is positioned in the stop slot to prevent the water outlet pipe from disengaging from the main unit.

In this embodiment, the pet water dispenser further includes an elastic sealed connecting pipe 5. The sealed connecting pipe 5 is equipped with a first end 51 and a second end 52. The first end 51 is sealingly connected to the first water outlet 32, and the second end 52 is sealingly connected to the first water flow channel. The water pump 3 is equipped with an installation bracket 33 and a pump body 34. The pump body 34 is connected to the installation bracket 33. The installation bracket 33 is detachably connected to the water dispenser main body 1. The pet water dispenser further includes a water outlet pipe 4. The water pump 3 is provided with a first water inlet 301 and a first water outlet 32. The water outlet pipe 4 is in communication with the water pump 3. The water outlet pipe 4 is provided with a second water inlet 41 and a second water outlet 42. The water outlet pipe 4 is sequentially in communication with the first water outlet 32 and the first water inlet 301. The water pump 3 is used for driving the liquid in the accommodating cavity 11 to pass through the first water inlet 301, the first water outlet 32, the second water inlet 41, and the second water outlet 42 in sequence and flow out through the second water outlet 42. The installation bracket 33 includes a bracket main body 331 and a bracket cover body 332. The first water outlet 32 is positioned in the bracket main body 331. The bracket cover body 332 is configured for covering the bracket main body 331, and the bracket cover body 332 is configured for pressing the sealed connecting pipe 5 against the first water outlet 32 of the bracket main body 331, so that the first water outlet 32 is sealingly connected to the first end 51. An installation slot 501 is defined in a lower end of the sealed connecting pipe 5. The installation slot 501 is connected to an end wall of the first water outlet 32. An upper end of the sealed connecting pipe 5 abuts against an end wall of the second water inlet 41. Through the above structure, the first water outlet 32 and the second water inlet 41 are sealingly connected by using the elastic sealed connecting pipe 5, which not only facilitates disassembly and assembly, but also effectively prevents water leakage at a connection between the first water outlet 32 and the second water inlet 41. A lower side of the bracket main body 331 is provided with a clamping part 3311. A side wall of the clamping part 3311 surrounds to form a U-shaped clamping cavity 3312. The clamping part 3311 clamps and locks the pump body 34 inside the clamping cavity 3312.

In this embodiment, the water pump 3 is equipped with an installation bracket 33 and a pump body 34. The pump body 34 is connected to the installation bracket 33. The installation bracket 33 is detachably connected to the water dispenser main body 1. The installation bracket 33 is provided with a first buckle portion 3321. The water dispenser main body 1 is provided with a first buckle fitting portion 12. The first buckle portion 3321 is detachably connected to the first buckle fitting portion 12. Specifically, the water dispenser main body 1 includes a base 13 and an upper cover 14. The upper cover 14 is connected to the base 13, and the accommodating cavity 11 is formed between the upper cover 14 and the base 13. Furthermore, the water pump 3 is equipped with an installation bracket 33 and a pump body 34. The pump body 34 is connected to the installation bracket 33. The installation bracket 33 is detachably connected to the water dispenser main body 1. The water dispenser main body 1 also includes a connecting part 15. The connecting part 15 is connected to the upper cover 14. The main unit 2 is connected to the connecting part 15. The water pump 3 is connected to the connecting part 15. The connecting part 15 is provided with a first side wall 151. The first side wall 151 surrounds to form a second installation hole 152. The installation bracket 33 is inserted into a lower side of the second installation hole 152. The main unit 2 is inserted into an upper side of the second installation hole 152. The main unit 2 is provided with a second buckle portion 26. An upper side of the connecting part 15 is provided with a second buckle fitting portion 153. The second buckle portion 26 is connected to the second buckle fitting portion 153. Furthermore, the main unit 2 is provided with a first opening 27, a second opening 28, and an elastic restoration member 29. The second buckle portion 26 includes an engaging block 261, a connecting plate 262, and a button 263. The engaging block 261 is connected to the button 263 through the connecting plate 262. The elastic restoration member 29 is configured for pushing the connecting plate 262, so as to push the engaging block 261 to extend out of the first opening 27 and connect with the second buckle fitting portion 153, and to push the button 263 to extend out of the second opening 28. When the button 263 is triggered, the button 263 retracts through the second opening 28, and the button 263 drives the connecting plate 262 and the engaging block 261 to retract, so that the engaging block 261 retracts through the first opening 27 to be separated from the second buckle fitting portion 153. Through the above structure, the design is reasonable, and the structure is simple. The user can press the button 263 to drive the connecting plate 262 and the engaging block 261 to retract, so that the engaging block 261 retracts through the first opening 27 to be separated from the second buckle fitting portion 153, which can facilitate the user's disassembly and assembly of the main unit 2. Moreover, by connecting the first buckle portion 332 with the first buckle fitting portion 12, it is easy for the user to disassemble and assemble the water pump 3. The pump body 34 is equipped with an insertion column 34111. An insertion opening 33111 is defined in the bracket main body 331. The insertion column is connected to the insertion opening 33111. Specifically, the first buckle portion 3321 is a first engaging convex block, the first buckle fitting portion 12 is a first engaging opening, and the first engaging convex block is detachably connected to the first engaging opening. Furthermore, a total number of the first buckle portions 3321 is at least two, and a total number of the first buckle fitting portions 12 is at least two. At least two first buckle portions 3321 are spaced apart from each other around a side wall of the installation bracket 33, and at least two first buckle fitting portions 12 are spaced apart from each other. Furthermore, the connecting part 15 is connected to the upper cover 14 through ultrasonic welding.

In this embodiment, an inner wall of the second installation hole 152 extends to form a support baffle 1521. The support baffle 1521 is used for supporting the main unit 2. A drainage hole 1522 is defined in the support baffle 1521. Through the above structure, the support baffle 1521 is provided to support the main unit 2, so that the main unit 2 can be more stably supported on the connecting part 15 of the upper cover 14. Moreover, due to the drainage hole 1522 defined in the support baffle 1521, the drainage hole 1522 is capable of discharging accumulated water in the second installation hole 152, so as to prevent the accumulated water in the second installation hole 152 from infiltrating into the main unit 2, the first conductive terminal 23, and the second conductive terminal 31, thereby improving the service life of the main unit 2 and enhancing the safety of the pet water dispenser.

In this embodiment, the pet water dispenser further includes a transparent viewable window 6. The base 13 is provided with a window opening 131. The viewable window 6 is connected to the base 13, and the viewable window 6 is configured for covering the window opening 131. A first sealing ring 132 is provided between the viewable window 6 and a side wall of the base 13. The viewable window 6 includes a front cover 61 and a rear cover 62. The rear cover 62 is connected to the front cover 61. The front cover is inserted into the window opening. The rear cover abuts against an inner side surface of the base. An inner wall of the window opening extends to form a positioning convex ring 63. A positioning ring slot 64 is defined in the first sealing ring. The first sealing ring is sleeved on the viewable window, and the positioning ring slot is connected to the positioning convex ring. The side wall of the base 13 is positioned between the front cover 61 and the rear cover 62. Specifically, the rear cover 62 is ultrasonically welded to the base. The viewable window 6 is a transparent plastic viewable window 6, and the base 13 is a metal base 13. Through the above structure, due to the arrangement of the viewable window 6, it is convenient for the user to observe a liquid level of the liquid in the base 13 through the viewable window 6, so that the user can replenish the liquid in the base 13 in a timely manner. Furthermore, due to the arrangement of the first sealing ring 132, the first sealing ring 132 is capable of sealing a gap at a connection between the viewable window 6 and the base 13 to prevent water leakage from the base 13. Moreover, the transparent plastic viewable window 6 is not only lightweight, but also easy to produce.

The metal base 13 has high strength and a long service life, and improves the texture of the whole pet water dispenser.

In this embodiment, the main unit 2 is also equipped with an infrared sensor 20. The infrared sensor 20 is electrically connected to the battery 21 and the control motherboard 22. The pet water dispenser further includes a switching switch 201. The switching switch 201 is used for controlling a working state of the water pump 3. When the switching switch 201 is long pressed, the switching switch 201 controls the water pump 3 to turn on or off. When the switching switch 201 is short pressed, the switching switch 201 switches the water pump 3 to a motion sensing mode, a timing mode, or an always-on mode. When the water pump 3 is in the motion sensing mode and the infrared sensor 20 detects a pet, the water pump 3 is turned on. When the water pump 3 is in the motion sensing mode and the infrared sensor 20 does not detect a pet, the water pump 3 is turned off. When the water pump 3 is in the timing mode, the water pump 3 is turned on or off regularly. When the water pump 3 is in the always-on mode, the water pump 3 remains in a turned-on state. The main unit 2 is provided with a charging port 202 and a first installation groove 2021. The charging port is positioned on an inner bottom surface of the first installation groove 2021. The charging port 202 is electrically connected to the battery 21 and the control motherboard 22. The pet water dispenser further includes a sealing cover 203. The sealing cover 203 is configured for detachably covering the charging port 202. A top surface of the sealing cover 203 is provided with a sealing protrusion 2032. A side surface of the sealing cover is provided with a sealing ring 20321. The sealing protrusion 2032 is inserted into the charging port 202. The sealing ring abuts against an inner side surface of the first installation groove. The sealing cover 203 is connected to the main unit 2 through a flexible band 2033. The main unit 2 is also equipped with a first indicator lamp 204, a second indicator lamp 205, a third indicator lamp 206, and a fourth indicator lamp 207. When the water pump 3 is in the motion sensing mode, the first indicator lamp 204 lights up. When the water pump 3 is in the timing mode, the second indicator lamp 205 lights up. When the water pump 3 is in the always-on mode, the third indicator lamp 206 lights up. When a filter element replacement reminder module 210 reminds to replace a first filter element 208, the fourth indicator lamp 207 lights up. Through the above structure, the user can use the switching switch 201 to switch a working mode of the water pump 3. For example, when the user uses the switching switch 201 to switch the water pump 3 to the motion sensing mode, and the infrared sensor 20 detects that a pet is approaching the pet water dispenser, the water pump 3 starts to work, and the water pump 3 draws the liquid in the base 13 and discharges the liquid through the second water outlet 42 for the pet to drink. For another example, when the user uses the switching switch 201 to switch the water pump 3 to the timing mode, the water pump 3 draws the liquid in the base 13 at regular intervals and discharges the liquid through the second water outlet 42 for the pet to drink. For another example, when the user uses the switching switch 201 to switch the water pump 3 to the always-on mode, the water pump 3 continuously draws the liquid in the base 13 and discharges the liquid through the second water outlet 42 for the pet to drink. The switching switch 201 is electrically connected to the control motherboard 22 and the water pump 3. Moreover, the sealing protrusion is inserted into the charging port to form a first level sealing for the charging port, and the sealing ring is squeezed and sealed on an inner side surface of the first installation groove to form a second level sealing for the charging port.

In this embodiment, the pet water dispenser further includes a water outlet pipe 4. The water pump 3 is provided with a first water inlet 301 and a first water outlet 32. The water outlet pipe 4 is in communication with the water pump 3. The water outlet pipe 4 is provided with a second water inlet 41 and a second water outlet 42. The water outlet pipe 4 is sequentially in communication with the first water outlet 32 and the first water inlet 301. The water pump 3 is used for driving the liquid in the accommodating cavity 11 to pass through the first water inlet 301, the first water outlet 32, the second water inlet 41, and the second water outlet 42 in sequence and flow out through the second water outlet 42. A side wall of the upper cover 14 surrounds to form an accommodating slot 141. The accommodating slot 141 is used for accommodating liquid. The second water outlet 42 of the water outlet pipe 4 is arranged facing the accommodating slot 141. A bottom portion of the accommodating slot 141 is provided with a drainage opening 142. The drainage opening 142 is in communication with the accommodating cavity 11. A filter box 7 is arranged at the drainage opening 142. The filter box 7 is equipped with an upper shell 71 and a lower shell 72. The upper shell 71 is connected to the lower shell 72, and the upper shell 71 and the lower shell 72 clamp the upper cover 14 tightly. The filter box 7 is equipped with a flip cover 73. One end of the flip cover 73 is rotatably connected to the lower shell 72, and an opposite end of the flip cover 73 is detachably connected to the lower shell 72 through a first buckle 10111. Moreover, a first filter cavity 74 is formed between the flip cover 73 and the lower shell 72. The first filter cavity 74 is used for receiving the first filter element 208. A plurality of first filter holes 731 are defined in the flip cover 73. Through the above structure, not only is the connection between the filter box 7 and the upper cover 14 effectively achieved, so that the water in the accommodating slot 141 can pass through the drainage opening 142 and the first filter element 208 in sequence, and flow into the accommodating cavity 11 of the base 13 after being filtered by the first filter element 208, but the user can also replace the filter element in the first filter cavity 74 by opening the flip cover 73.

In this embodiment, the pet water dispenser further includes a water outlet pipe 4. The water pump 3 is provided with a first water inlet 301 and a first water outlet 32. The water outlet pipe 4 is in communication with the water pump 3. The water outlet pipe 4 is provided with a second water inlet 41 and a second water outlet 42. The water outlet pipe 4 is sequentially in communication with the first water outlet 32 and the first water inlet 301. The water pump 3 is used for driving the liquid in the accommodating cavity 11 to pass through the first water inlet 301, the first water outlet 32, the second water inlet 41, and the second water outlet 42 in sequence and flow out through the second water outlet 42. The installation bracket 33 is provided with a second water flow channel 333. One end of the second water flow channel 333 is in communication with the first water inlet 301, and the first water outlet 32 is positioned at an opposite end of the second water flow channel 333. The installation bracket 33 is also provided with a water separation cavity 334. The water separation cavity 334 is separated from the second water flow channel 333. The second conductive terminal 31 is arranged inside the water separation cavity 334. A wire threading hole 335 is defined in the installation bracket 33. A second sealing ring 336 is arranged inside the wire threading hole 335. The second sealing ring 336 is provided with a first sealing gasket 3361, a second sealing gasket 3362, and a wire threading ring 3363. The wire threading ring 3363 is connected to the first sealing gasket 3361 and the second sealing gasket 3362. The first sealing gasket 3361 abuts against an inner side surface of the installation bracket 33. The second sealing gasket 3362 abuts against an outer side surface of the installation bracket 33. The wire threading ring 3363 abuts against an inner wall of the wire threading hole 335. Through the above structure, an electrical connection wire can be threaded into the wire threading ring 3363 and connected to the second conductive terminal 31 inside the water separation cavity 334, and an inner wall of the wire threading ring 3363 can be squeezed and sealed on an outer surface of the electrical connection wire, so as to prevent water from flowing into the water separation cavity 334 through a gap between the wire threading ring 3363 and the electrical connection wire. Moreover, the first sealing gasket 3361 abuts against the inner side surface of the installation bracket 33, and the second sealing gasket 3362 abuts against the outer side surface of the installation bracket 33, so that a gap between the wire threading ring 3363 and the wire threading hole 335 can be sealed.

In this embodiment, the water pump 3 is provided with the first water inlet 301, and a filter mesh cover 311 is provided at the first water inlet 301. A second filter cavity 3111 is defined in the filter mesh cover 311. The second filter cavity 3111 is used for receiving a second filter element 209. A plurality of second filter holes 3112 are defined in the filter mesh cover 311. The pet water dispenser further includes a filter element replacement reminder module 210. The filter element replacement reminder module 210 is electrically connected to the control motherboard 22. The filter element replacement reminder module 210 is used for reminding a user to replace the first filter element 208 and/or the second filter element 209. Through the above structure, the water in the base 13 is filtered by the second filter element 209 and then pumped by the water pump 3 to the water outlet pipe 4, and flows out through the second water outlet 42, so that the pet can drink water from the second water outlet 42. Moreover, due to the arrangement of the filter element replacement reminder module 210, the user can be reminded to replace the filter element regularly. The filter element replacement reminder module 210 is a timer that reminds the user to replace the filter element at regular intervals.

In this embodiment, a height of the water dispenser main body 1 is in a range from 8 cm to 25 cm, and a width of the water dispenser main body 1 is in a range from 4 cm to 14 cm. A width of the viewable window 6 is in a range from 1 cm to 6 cm. A height of the main unit 2 is in a range from 2 cm to 15 cm, and a width of the main unit 2 is in a range from 0.5 cm to 4 cm. A height of the pump body 34 is in a range from 1 cm to 5 cm, a width of the pump body 34 is in a range from 1 cm to 5 cm, and a length of the pump body 34 is in a range from 3 cm to 10 cm. A length of the filter box 7 is in a range from 5 cm to 15 cm, a width of the filter box 7 is in a range from 2 cm to 10 cm, and a height of the filter box 7 is in a range from 0.5 cm to 5 cm. A height of the water outlet pipe 4 is in a range from 5 cm to 15 cm. A height of the installation bracket 33 is in a range from 5 cm to 20 cm. A width of the drainage opening 142 is 0.01 cm to 2 cm, a height of the drainage opening 142 is in a range from 0.01 cm to 2 cm, and a length of the drainage opening 142 is in a range from 2 cm to 10 cm. Through the above structure, the size setting is reasonable, and the use requirements of the user for the pet water dispenser in different scenarios can be met. Moreover, the viewable window 6, with a width ranging from 1 cm to 6 cm, allows the user to better observe the liquid level of the liquid in the base 13.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A pet water dispenser, comprising:
   a water dispenser main body, wherein an accommodating cavity is defined in the water dispenser main body, and the accommodating cavity is used for accommodating liquid;
   a main unit, wherein a battery and a control motherboard are provided inside the main unit, the main unit is provided with a first conductive terminal, and the first conductive terminal is electrically connected to the battery and the control motherboard; and
   a water pump, wherein the water pump is used for drawing the liquid inside the accommodating cavity; the water pump is provided with a second conductive terminal, and the second conductive terminal is detachably connected to the first conductive terminal, so that the water pump is electrically connected to the battery and the control motherboard;
   wherein the water pump is equipped with an installation bracket and a pump body; the pump body is connected to the installation bracket; and the installation bracket is detachably connected to the water dispenser main body;
   wherein the installation bracket is detachably connected to the water dispenser main body; the installation bracket is provided with a first buckle portion; the water dispenser main body is provided with a first buckle fitting portion; and the first buckle portion is detachably connected to the first buckle fitting portion.

2. The pet water dispenser according to claim 1, wherein the first conductive terminal is a protruding first conductive pogo pin, the second conductive terminal is a conductive ring, and the first conductive pogo pin is detachably inserted into the conductive ring, so that a side wall of the first conductive pogo pin abuts against a side wall of the conductive ring, so as to electrically connect the water pump to the battery.

3. The pet water dispenser according to claim 1, further comprising a water outlet pipe, wherein the main unit is provided with a first water flow channel and a first installation hole; the first water flow channel is in communication with the first installation hole; the water pump is provided with a first water inlet and a first water outlet; the water outlet pipe is provided with a second water inlet and a second water outlet; the water outlet pipe is detachably connected to the first installation hole; the water outlet pipe is sequentially in communication with the first water flow channel, the first water outlet, and the first water inlet; and the water pump is used for driving the liquid in the accommodating cavity to pass through the first water inlet, the first water outlet, the first water flow channel, the second water inlet, and the second water outlet in sequence and flow out through the second water outlet.

4. The pet water dispenser according to claim 3, wherein the water outlet pipe comprises a positioning ring; a positioning inner wall is provided in the first installation hole; when the water outlet pipe is detachably connected to the first installation hole, the positioning ring is connected to the positioning inner wall, and the positioning ring and the positioning inner wall are not rotatable relative to each other, so that the water outlet pipe is not rotatable inside the first installation hole.

5. The pet water dispenser according to claim 3, further comprising an elastic sealed connecting pipe, wherein the sealed connecting pipe is equipped with a first end and a second end; the first end is sealingly connected to the first water outlet; and the second end is sealingly connected to the first water flow channel.

6. The pet water dispenser according to claim 5, wherein the water outlet pipe is in communication with the water pump; the installation bracket comprises a bracket main body and a bracket cover body; the first water outlet is positioned in the bracket main body; the bracket cover body is configured for covering the bracket main body; the bracket cover body is configured for pressing the sealed connecting pipe against the first water outlet of the bracket main body, so that the first water outlet is sealingly connected to the first end; an installation slot is defined in a lower end of the sealed connecting pipe; the installation slot is connected to an end wall of the first water outlet; and an upper end of the sealed connecting pipe abuts against an end wall of the second water inlet.

7. The pet water dispenser according to claim 1, wherein the water dispenser main body comprises a base and an upper cover; the upper cover is connected to the base; and the accommodating cavity is formed between the upper cover and the base.

8. The pet water dispenser according to claim 7, further comprising a transparent viewable window, wherein the base is provided with a window opening; the viewable window is connected to the base; the viewable window is configured for covering the window opening; and a first sealing ring is provided between the viewable window and a side wall of the base.

9. The pet water dispenser according to claim 8, wherein the viewable window comprises a front cover and a rear cover; the rear cover is connected to the front cover; the front cover is inserted into the window opening; the rear cover abuts against an inner side surface of the base; an inner wall of the window opening extends to form a positioning convex ring; a positioning ring slot is defined in the first sealing ring; the first sealing ring is sleeved on the viewable window; the positioning ring slot is connected to the positioning convex ring; and the side wall of the base is positioned between the front cover and the rear cover.

10. The pet water dispenser according to claim 9, wherein the rear cover is ultrasonically welded to the base; the viewable window is a transparent plastic viewable window; and the base is a metal base.

11. The pet water dispenser according to claim 8, wherein a height of the water dispenser main body is in a range from 8 cm to 25 cm, and a width of the water dispenser main body is in a range from 4 cm to 14 cm; a width of the viewable window is in a range from 1 cm to 6 cm; a height of the main unit is in a range from 2 cm to 15 cm, and a width of the main unit is in a range from 0.5 cm to 4 cm.

12. The pet water dispenser according to claim 1, wherein the main unit is also equipped with an infrared sensor; the infrared sensor is electrically connected to the battery and the control motherboard; the pet water dispenser further comprises a switching switch; the switching switch is used for controlling a working state of the water pump; when the switching switch is long pressed, the switching switch controls the water pump to turn on or off; when the switching switch is short pressed, the switching switch switches the water pump to a motion sensing mode, a timing mode, or an always-on mode; when the water pump is in the motion sensing mode and the infrared sensor detects a pet, the water pump is turned on; when the water pump is in the motion sensing mode and the infrared sensor does not detect a pet, the water pump is turned off; when the water pump is in the timing mode, the water pump is turned on or off regularly; when the water pump is in the always-on mode, the water pump remains in a turned-on state; the main unit is provided with a charging port and a first installation groove; the charging port is positioned on an inner bottom surface of the first installation groove; the charging port is electrically connected to the battery and the control motherboard; the pet water dispenser further comprises a sealing cover; the sealing cover is configured for detachably covering the charging port; a top surface of the sealing cover is provided with a sealing protrusion; a side surface of the sealing cover is provided with a sealing ring; the sealing protrusion is inserted into the charging port; the sealing ring abuts against an inner side surface of the first installation groove; the sealing cover is connected to the main unit through a flexible band; the main unit is also equipped with a first indicator lamp, a second indicator lamp, a third indicator lamp, and a fourth indicator lamp; when the water pump is in the motion sensing mode, the first indicator lamp lights up; when the water pump is in the timing mode, the second indicator lamp lights up; when the water pump is in the always-on mode, the third indicator lamp lights up; and when a filter element replacement reminder module reminds to replace a first filter element, the fourth indicator lamp lights up.

13. A pet water dispenser, comprising:
  a water dispenser main body, wherein an accommodating cavity is defined in the water dispenser main body, and the accommodating cavity is used for accommodating liquid;
  a main unit, wherein a battery and a control motherboard are provided inside the main unit, the main unit is provided with a first conductive terminal, and the first conductive terminal is electrically connected to the battery and the control motherboard; and
  a water pump, wherein the water pump is used for drawing the liquid inside the accommodating cavity; the water pump is provided with a second conductive terminal, and the second conductive terminal is detachably connected to the first conductive terminal, so that the water pump is electrically connected to the battery and the control motherboard;
  wherein the water dispenser main body comprises a base and an upper cover; the upper cover is connected to the base; and the accommodating cavity is formed between the upper cover and the base;
  wherein the water pump is equipped with an installation bracket and a pump body; the pump body is connected to the installation bracket; the installation bracket is detachably connected to the water dispenser main body; the water dispenser main body also comprises a connecting part; the connecting part is connected to the upper cover; the main unit is connected to the connecting part; the water pump is connected to the connecting part; the connecting part is provided with a first side wall; the first side wall surrounds to form a second installation hole; the installation bracket is inserted into a lower side of the second installation hole; the main unit is inserted into an upper side of the second installation hole; the main unit is provided with a second buckle portion; an upper side of the connecting part is provided with a second buckle fitting portion; and the second buckle portion is connected to the second buckle fitting portion.

14. The pet water dispenser according to claim 13, wherein the main unit is provided with a first opening, a second opening, and an elastic restoration member; the second buckle portion comprises an engaging block, a connecting plate, and a button; the engaging block is connected to the button through the connecting plate; the elastic restoration member is configured for pushing the connecting plate, so as to push the engaging block to extend out of the first opening and connect with the second buckle fitting portion, and to push the button to extend out of the second opening; when the button is triggered, the button retracts through the second opening, and the button drives the connecting plate and the engaging block to retract, so that the engaging block retracts through the first opening to be separated from the second buckle fitting portion.

15. The pet water dispenser according to claim 13, wherein an inner wall of the second installation hole extends to form a support baffle; the support baffle is used for supporting the main unit; and a drainage hole is defined in the support baffle.

16. A pet water dispenser, comprising:
a water dispenser main body, wherein an accommodating cavity is defined in the water dispenser main body, and the accommodating cavity is used for accommodating liquid;
a main unit, wherein a battery and a control motherboard are provided inside the main unit, the main unit is provided with a first conductive terminal, and the first conductive terminal is electrically connected to the battery and the control motherboard; and
a water pump, wherein the water pump is used for drawing the liquid inside the accommodating cavity; the water pump is provided with a second conductive terminal, and the second conductive terminal is detachably connected to the first conductive terminal, so that the water pump is electrically connected to the battery and the control motherboard;
wherein the water dispenser main body comprises a base and an upper cover; the upper cover is connected to the base; and the accommodating cavity is formed between the upper cover and the base;
wherein the pet water dispenser further comprises a water outlet pipe, the water pump is provided with a first water inlet and a first water outlet; the water outlet pipe is in communication with the water pump; the water outlet pipe is provided with a second water inlet and a second water outlet; the water outlet pipe is sequentially in communication with the first water outlet and the first water inlet; the water pump is used for driving the liquid in the accommodating cavity to pass through the first water inlet, the first water outlet, the second water inlet, and the second water outlet in sequence and flow out through the second water outlet; a side wall of the upper cover surrounds to form an accommodating slot; the accommodating slot is used for accommodating liquid; the second water outlet of the water outlet pipe is arranged facing the accommodating slot; a bottom portion of the accommodating slot is provided with a drainage opening; the drainage opening is in communication with the accommodating cavity; a filter box is arranged at the drainage opening; the filter box is equipped with an upper shell and a lower shell; the upper shell is connected to the lower shell; the upper shell and the lower shell clamp the upper cover; the filter box is equipped with a flip cover; one end of the flip cover is rotatably connected to the lower shell; an opposite end of the flip cover is detachably connected to the lower shell through a first buckle; a first filter cavity is formed between the flip cover and the lower shell; the first filter cavity is used for receiving a first filter element; and a plurality of first filter holes are defined in the flip cover.

17. The pet water dispenser according to claim 16, wherein the water pump is provided with the first water inlet; a filter mesh cover is provided at the first water inlet; a second filter cavity is defined in the filter mesh cover; the second filter cavity is used for receiving a second filter element; a plurality of second filter holes are defined in the filter mesh cover; the pet water dispenser further comprises a filter element replacement reminder module; the filter element replacement reminder module is electrically connected to the control motherboard; and the filter element replacement reminder module is used for reminding a user to replace the first filter element and/or the second filter element.

18. A pet water dispenser, comprising:
a water dispenser main body, wherein an accommodating cavity is defined in the water dispenser main body, and the accommodating cavity is used for accommodating liquid;
a main unit, wherein a battery and a control motherboard are provided inside the main unit, the main unit is provided with a first conductive terminal, and the first conductive terminal is electrically connected to the battery and the control motherboard; and
a water pump, wherein the water pump is used for drawing the liquid inside the accommodating cavity; the water pump is provided with a second conductive terminal, and the second conductive terminal is detachably connected to the first conductive terminal, so that the water pump is electrically connected to the battery and the control motherboard;
wherein the water pump is equipped with an installation bracket and a pump body; the pump body is connected to the installation bracket; and the installation bracket is detachably connected to the water dispenser main body;
wherein the pet water dispenser further comprises a water outlet pipe, the water pump is provided with a first water inlet and a first water outlet; the water outlet pipe is in communication with the water pump; the water outlet pipe is provided with a second water inlet and a second water outlet; the water outlet pipe is sequentially in communication with the first water outlet and the first water inlet; the water pump is used for driving the liquid in the accommodating cavity to pass through the first water inlet, the first water outlet, the second water inlet, and the second water outlet in sequence and flow out through the second water outlet; the installation bracket is provided with a second water flow channel; one end of the second water flow channel is in communication with the first water inlet; the first water outlet is positioned at an opposite end of the second water flow channel; the installation bracket is also provided with a water separation cavity; the water separation cavity is separated from the second water flow channel; the second conductive terminal is arranged inside the water separation cavity; a wire threading hole is defined in the installation bracket; a second sealing ring is arranged inside the wire threading hole; the second sealing ring is provided with a first sealing gasket, a second sealing gasket, and a wire threading ring; the wire threading ring is connected to the first sealing gasket and the second sealing gasket; the first sealing gasket abuts against an inner side surface of the installation bracket; the second sealing gasket abuts against an outer side surface of the installation bracket; and the wire threading ring abuts against an inner wall of the wire threading hole.

* * * * *